US012654125B1

(12) United States Patent
Cao et al.

(10) Patent No.: US 12,654,125 B1
(45) Date of Patent: Jun. 16, 2026

(54) FORMING AND PROCESSING SLURRY IN CARBON DIOXIDE CAPTURE AND SEPARATION SYSTEMS

(71) Applicant: AirMyne, Inc., Berkeley, CA (US)

(72) Inventors: Cyndia Aiyun Cao, Oakland, CA (US); Abdullah Fattahi, Fullerton, CA (US); Bart Ludo Scherpbier, San Francisco, CA (US); Flynn Corrigan Michael Legg, Oakland, CA (US); Derek Chase Popple, Sacramento, CA (US); Ngoc The Pham, San Jose, CA (US); Mark Patrick Cyffka, El Cerrito, CA (US); Sudip Mukhopadhyay, Berkeley, CA (US)

(73) Assignee: AirMyne, Inc., Berkeley, CA (US)

( * ) Notice: Subject to any disclaimer, the term of this patent is extended or adjusted under 35 U.S.C. 154(b) by 0 days.

(21) Appl. No.: 19/347,459

(22) Filed: Oct. 1, 2025

(51) Int. Cl.
*B01D 53/14* (2006.01)
*B01D 33/06* (2006.01)
*B01D 33/56* (2006.01)

(52) U.S. Cl.
CPC ......... *B01D 53/1475* (2013.01); *B01D 33/06* (2013.01); *B01D 33/56* (2013.01); *B01D 2257/504* (2013.01)

(58) Field of Classification Search
CPC .... B01D 53/14; B01D 53/1475; B01D 33/06; B01D 33/56; B01D 2257/504
USPC ...... 96/243, 290; 95/195–197, 236; 423/220
See application file for complete search history.

(56) References Cited

U.S. PATENT DOCUMENTS

| 12,274,977 | B1 | 4/2025 | Scherpbier et al. |
| 2021/0093993 | A1* | 4/2021 | Strand ................... B01D 53/08 |
| 2024/0359129 | A1* | 10/2024 | Qiu ................... B01D 53/0454 |

OTHER PUBLICATIONS

KC8 Capture Technologies, http://www.kc8capture.com/, 6 pages, accessed on Aug. 7, 2025.

(Continued)

*Primary Examiner* — Frank M Lawrence, Jr.
(74) *Attorney, Agent, or Firm* — Henry Patent Law Firm PLLC

(57) ABSTRACT

In a general aspect, a carbon dioxide ($CO_2$) capture and separation system is presented. In some implementations, a carbon dioxide capture and separation system includes a slurry processing system fluidically connected to first and second gas-liquid contactors. The slurry processing system includes a gravity-driven separation unit. The slurry processing system is configured to receive a $CO_2$-rich slurry including precipitated reaction products from the first gas-liquid contactor, form a solid-enriched $CO_2$-rich slurry and a clarified $CO_2$-lean solution based on the $CO_2$-rich slurry. The first gas-liquid contactor is configured to receive a gaseous feed and receive the clarified $CO_2$-lean solution from the slurry processing system. The clarified $CO_2$-lean solution captures $CO_2$ from the gaseous feed in the first gas-liquid contactor to form the $CO_2$-rich slurry. The second gas-liquid contactor is configured to receive the solid-enriched $CO_2$-rich slurry and extract $CO_2$ from the solid-enriched $CO_2$-rich slurry.

30 Claims, 7 Drawing Sheets

(56)     References Cited

OTHER PUBLICATIONS

"Hydrocyclones, Cyclone Clusters and Systems", Gravity Cyclones, https://www.gravitycyclones.com/, 2 pages, accessed on Aug. 7, 2025.

"Lamella clarifier", https://en.wikipedia.org/wiki/Lamella_clarifier, accessed on Sep. 25, 2025, 7 pages.

"Spiral Classifier, Dewatering Screw", https://mbmmllc.com/products/spiral-classifier-dewatering-screw/, 3 pages, accessed on Aug. 7, 2025.

Kim, et al., "Antisolvent Precipitation of Potassium Bicarbonate from KHCO3+H20+Ethanol/2-Propanol Systems in the CO2 Capture Process", Ind. Eng. Chem. Res. 2015, 54, 33, 8287-8294, 8 pages.

Moene, et al., "Precipitating carbonate process for energy efficient postcombustion CO2 capture", Energy Procedia, vol. 37, 2013, pp. 1881-1887, 7 pages.

Smith, et al., "Pilot plant results for a precipitating potassium carbonate solvent absorption process promoted with glycine for enhanced CO2 capture", Fuel Processing Technology 135 (2015) 60-65, 6 pages.

Wu, et al., "Nucleation kinetics of glycine promoted concentrated potassium carbonate solvents for carbon dioxide absorption", Chemical Engineering Journal 381 (2020) 122712, 11 pages.

Xiao, et al., "Demonstration of a Concentrated Potassium Carbonate Process for CO2 Capture", dx.doi.org/10.1021/ef4014746 | Energy Fuels 2014, 28, 299-306, 8 pages.

Zhang, et al., "Development of a Potassium Carbonate-Based Absorption Process with Crystallization-Enabled High-Pressure Stripping for CO2 Capture: Vapor-Liquid Equilibrium Behavior and CO2 Stripping Performance of Carbonate/Bicarbonate Aqueous Systems", Energy Procedia, vol. 63, 2014, pp. 665-675, 11 pages.

* cited by examiner

400

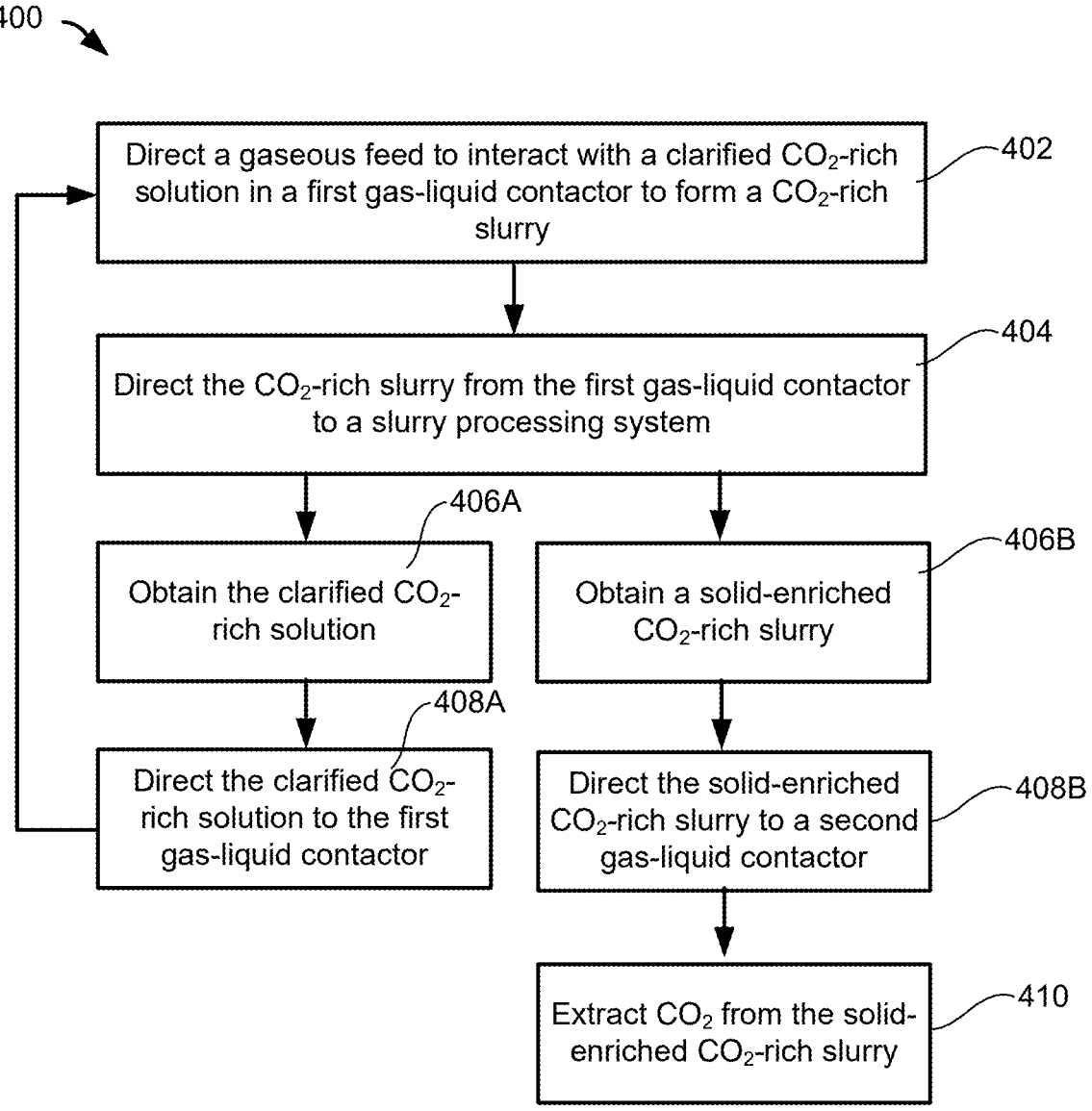

Direct a gaseous feed to interact with a clarified $CO_2$-rich solution in a first gas-liquid contactor to form a $CO_2$-rich slurry    402

Direct the $CO_2$-rich slurry from the first gas-liquid contactor to a slurry processing system    404

Obtain the clarified $CO_2$-rich solution    406A

Obtain a solid-enriched $CO_2$-rich slurry    406B

Direct the clarified $CO_2$-rich solution to the first gas-liquid contactor    408A Direct the solid-enriched $CO_2$-rich slurry to a second gas-liquid contactor    408B Extract $CO_2$ from the solid-enriched $CO_2$-rich slurry    410

FIG. 4

FORMING AND PROCESSING SLURRY IN CARBON DIOXIDE CAPTURE AND SEPARATION SYSTEMS

TECHNICAL FIELD

The following description relates to forming and processing slurry in carbon dioxide capture and separation systems.

BACKGROUND

Point-source capture technologies can be used to separate carbon dioxide gas from flue gas emitted from industrial facilities. Direct air capture (DAC) technologies can be used to separate carbon dioxide gas from atmosphere. Point-source capture DAC technologies can be used for environmental purposes, for example to reverse, reduce, or otherwise mitigate emissions, or to generate carbon dioxide gas for sale in commercial or industrial applications.

BRIEF DESCRIPTION OF THE DRAWINGS

FIG. 4 is a flow chart showing operations in an example carbon dioxide removing process.

DETAILED DESCRIPTION

In some aspects of what is described here, a carbon dioxide capture and separation system includes a slurry processing system positioned between first and second gas-liquid contactors to improve energy efficiency and process performance. In some examples, the slurry processing system receives a $CO_2$-rich slurry containing both dissolved and precipitated reaction products from the first gas-liquid contactor and separates it into a solid-enriched $CO_2$-rich slurry in a mixed stream and a clarified $CO_2$-lean solution in a solution stream. The solid-enriched $CO_2$-rich slurry, having a higher concentration of precipitated reaction products, can be directed to the second gas-liquid contactor for $CO_2$ extraction, while the clarified $CO_2$-lean solution is recycled back to the first gas-liquid contactor for continued $CO_2$ absorption.

In some implementations, a slurry processing system may include one or more of various types of liquid-solid separation units such as gravity-driven separation units (e.g., spiral classifiers, lamella clarifiers, rake classifiers, gravity-belt thickeners, drum filters, etc.), and centrifugal force-driven separation units (e.g., hydrocyclones, centrifuges, etc.). These liquid-solid separation units can be arranged in series or parallel configurations to perform multistage enrichment of precipitated reaction products. The slurry processing system can also include heat exchangers to induce temperature changes that promote additional precipitation of reaction products from solution.

In some implementations, the slurry processing system provides improved energy efficiency by concentrating the precipitated reaction products in a mixed stream of a $CO_2$-rich slurry before the energy-intensive desorption process, thereby reducing the total energy input needed per unit weight of $CO_2$ removed. In some instances, the systems and methods presented here can reduce the energy consumption in the desorption column to a value less than 1 Megawatt-hour/ton $CO_2$. The system may also decouple upstream and downstream performance, allowing the absorption process to operate in varying environmental conditions while maintaining consistent downstream processing. The alkaline capture solution may include aqueous ionic bases, phase transfer catalysts, amino acid, amines, surfactants, viscosity modifiers, anti-foaming agents, corrosion inhibitors, spectator ions, and carboxylic acid salts of amino acids, and can maintain effective $CO_2$ capture rates through multiple cycles of operation. In some instances, the systems and methods presented here can produce $CO_2$ gas at high purity (>99.5%). In some cases, a combination of these and potentially other advantages and improvements may be obtained.

Figure 1:
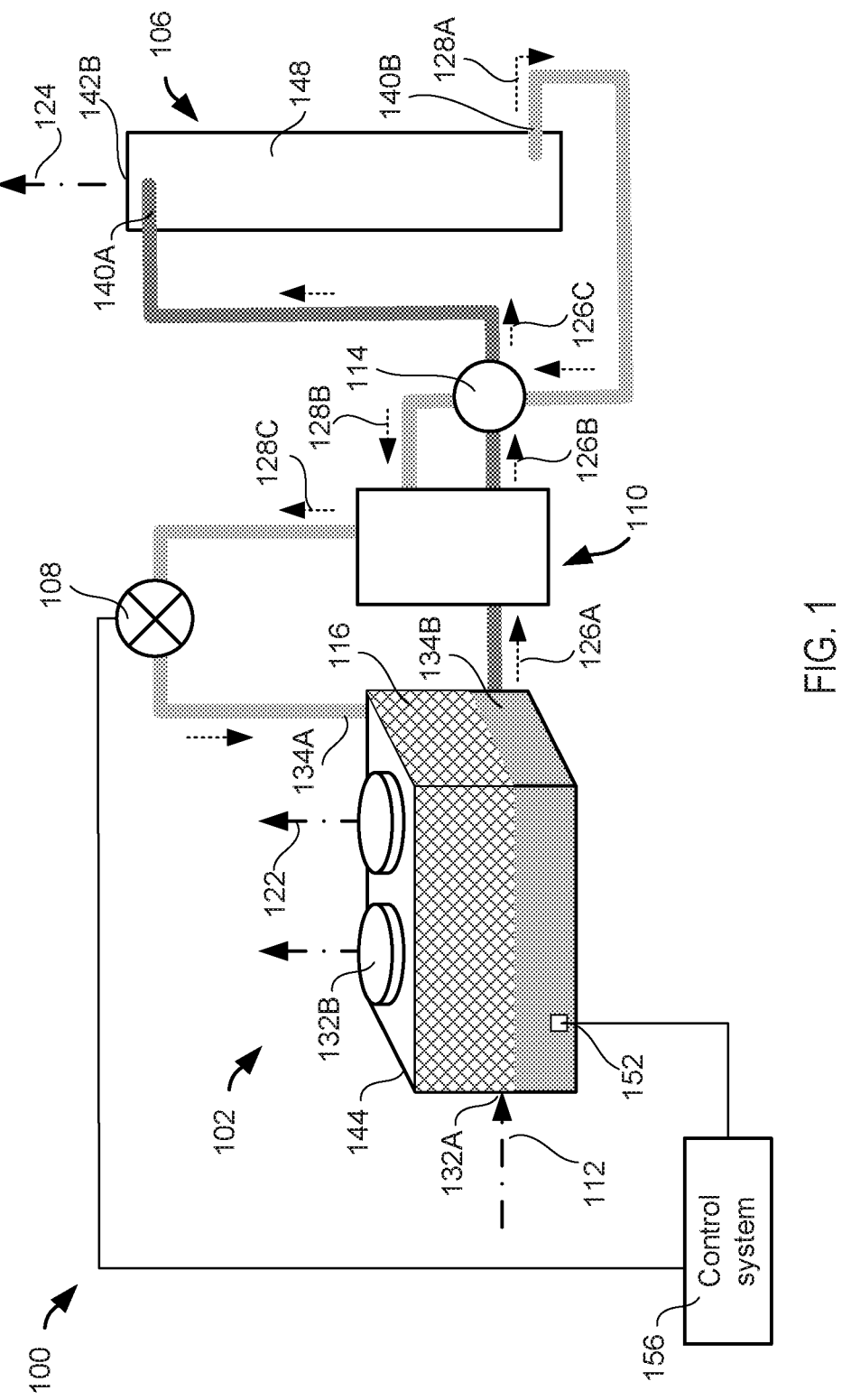
FIG. 1 is a schematic diagram showing aspects of an example carbon dioxide capture and separation system.

FIG. 1 is a schematic diagram showing aspects of an example carbon dioxide capture and separation system 100. In some implementations, the carbon dioxide capture and separation system 100 is configured to perform a carbon dioxide ($CO_2$) capture and separation process by absorbing $CO_2$ gas from a gaseous feed 112 (e.g., ambient air, flue gas, or a mixture) using an alkaline capture solution. At least a portion of the $CO_2$ gas from the gaseous feed 112 can interact and react with the alkaline capture solution in an absorption reaction. A $CO_2$-rich slurry which includes dissolved reaction products and precipitated reaction products can be formed. By operation of a slurry processing system 110, the concentration of the precipitated reaction products in the $CO_2$-rich slurry can be enriched producing a solid-enriched $CO_2$-rich slurry and a clarified $CO_2$-lean solution. Throughout the present application, a "$CO_2$-rich" slurry includes both dissolved and precipitated reaction products; and a clarified "$CO_2$-lean" solution includes only dissolved reaction products with a negligible concentration of the precipitated reaction products. The solid-enriched $CO_2$-rich slurry can be fed into a desorption column for a desorption reaction; and the clarified $CO_2$-lean solution can be fed back to the absorption column for further absorption reaction. In some instances, the example carbon dioxide capture and separation system 100 can provide improved energy efficiency by reducing the total energy input needed per a unit weight of $CO_2$ removed; and thus, can reduce the total cost of the $CO_2$ separation process. In some instances, the systems and methods presented here can provide other advantages over conventional carbon dioxide separation processes.

As shown in FIG. 1, the example carbon dioxide capture and separation system 100 includes a first gas-liquid contactor 102 in which an upstream or absorption reaction is performed; and a second gas-liquid contactor 106 in which a downstream or desorption reaction is performed. During the absorption reaction, at least a portion of the $CO_2$ gas is removed from the gaseous feed 112. The $CO_2$ from the gaseous feed 112 is captured by first dissolving into the fresh alkaline capture solution. The capture agents from the alkaline capture solution then binds with the $CO_2$ to form dissolved reaction products. Under certain conditions, the dissolved $CO_2$ reaction products may precipitate out and form precipitated reaction products, producing a $CO_2$-rich slurry. In other words, the $CO_2$-rich slurry formed in the first gas-liquid contactor 102 includes reaction products in the form of both dissolved and precipitated reaction products. In some implementations, the concentration of the dissolved reaction products in the $CO_2$-rich slurry produced in the first gas-liquid contactor 102 is in a range of is in a range of 0.001 to 50 wt %, more specifically 0.001-30 wt %, more precisely 0.001-22 wt % (weight percent); and the concentration of the precipitated reaction products in the $CO_2$-rich slurry is in a range of 0.001-10 wt %. The molar conversion is in a range of 5-90%. In some instances, the molar conversion is the conversion extent of the reaction, measured as the percentage of moles of the capture agents from the alkaline capture solution that have reacted into the product. In some instances, the molar conversion is the number of moles of the reaction product normalized by the number of moles of reaction product that would be present if all reactants were consumed in the reaction. In some instances, the concentration of the precipitated reaction products is the weight of the solids in the $CO_2$-rich slurry relative to the weight of the entire $CO_2$-rich slurry, including the liquid solution that carries the solid precipitates. In some instances, this concentration of the precipitated reaction products can also be measured volumetrically. In some implementations, the precipitated reaction products primarily include micro-crystallites of less than 200 microns in length upon entering the slurry processing system 110. In some implementations, the $CO_2$-rich slurry produced from the first gas-liquid contactor 102 in an output mixed stream 126A may have a temperature in a range of −10 to 50 degrees Celsius (° C.) when the gaseous feed 112 includes ambient air and may have a higher temperature up to 100° C. when the gaseous feed 112 includes flue gas or a mixture of ambient air and flue gas.

In some instances, the first gas-liquid contactor 102 includes an interfacial surface structure 116. The gaseous feeds 112 can be passed through the interfacial surface structure 116 in the first gas-liquid contactor 102. The interfacial surface structure 116 may be configured to provide a high specific surface area, a high specific liquid mass retention of the liquid phase (e.g., the alkaline capture solution) on the surfaces of the interfacial surface structure 116, an efficient mass transfer, a low pressure loss, efficient carbon dioxide stripping, or any combination of some or all of these properties. In some cases, the interfacial surface structure 116 includes a reticulated structure defined by a cascade of contactor sheets. In some instances, contactor sheets may be packed with one another and separated by respective gaps defined by spacers defining spacings between neighboring contactor sheets. The contactor sheets can be assembled and arranged in the gas-liquid contactor 102 according to the gas flow and the liquid flow. For example, the extension direction of the contactor sheets may be in parallel with both directions of the gas flow and the liquid flow. In some implementations, the contactor sheets are easy to assemble to facilitate a homogenous gas and liquid distribution that avoids premature local flooding and pressure loss.

In some instances, each contactor sheet of the reticulated structure of the interfacial surface structure 116 in the gas-liquid contactor 102 can be manufactured individually. For example, each contactor sheet can be produced using a compression molding process, an injection molding process, a screen-printing process, a hot melt process, a vacuum molding process, a lamination process, additive manufacturing, sheet metal bending, an extrusion process, or other types of processes. In some instances, each contactor sheet of the interfacial surface structure 116 includes a thermoplastic material. For example, each contactor sheet of the interfacial surface structure 116 includes one or more of the following Polyethylene Polyvinyl Chloride (PVC), Polypropylene, Polyethylene terephthalate (PET), Polystyrene, Acrylonitrile butadiene styrene (ABS), or other types of thermoplastic material. In some instances, each contactor sheet of the interfacial surface structure 116 includes epoxide polymer, acrylic polymer, or another polymer. In some instances, the reticulated structure of the interfacial surface structure 116 can be produced using a 3D printing process, an electrospinning process, a cold-spray process, or another type of manufacturing process.

Surfaces of the interfacial surface structure 116 are wetted by the alkaline capture solution, which the $CO_2$ gas from the gaseous feeds diffuses into. In some instances, the second gas-liquid contactor 106 may be implemented as a desorption column, a stripping column, or another type of gas-liquid contactor for extracting $CO_2$. The carbon dioxide capture and separation system 100 may include additional or different features, and the components of the carbon dioxide capture and separation system 100 may operate as described with respect to FIG. 4 or in another manner. For example, the carbon dioxide capture and separation system 100 may include multiple first gas-liquid contactors 102 and multiple second gas-liquid contactors 106. In some instances, the slurry processing system 110 may be connected to one or more first gas-liquid contactors 102 and one or more second gas-liquid contactors 106. In some instances, the number of first gas-liquid contactors 102 may be different from the number of second gas-liquid contactors 106. In some instances, the first gas-liquid contactor 102 may not include an interfacial surface structure 116 and the gaseous feed 112 is bubbled through the alkaline capture solution. In this case, the first gas-liquid contactor 102 may be a bubble column.

When the gaseous feed 112 is drawn from ambient air, the first gas-liquid contactor 102 operates as a direct air capture (DAC) system configured to directly remove $CO_2$ from the ambient air. The gaseous feed 112 at the first gas-liquid contactor 102 has a $CO_2$ concentration below 1500 parts per million (ppm). When the gaseous feed 112 is drawn from an industrial point source, the first gas-liquid contactor 102 may operate as a post combustion capture (PCC) system or point source system configured to remove $CO_2$ from the flue gas. In some instances, the flue gas can be generated from multiple distinct large industrial point sources, which may have different concentrations of $CO_2$. In some instances, the gaseous feed 112 has a $CO_2$ concentration in a range of above 1%, in a range of 1500 ppm to 50 wt %, or another range. In some implementations, the gaseous feed is directed into the first gas-liquid contactor 102 at a pressure in a range of 0.01 to 10,000 psig (pounds per square inch gauge), at a partial pressure of $CO_2$ in a range of 1e-8 to 1e8 psig, or in another range. In some instances, the gaseous feed 112 includes a mixture of the flue gas and ambient air. In certain examples, the gaseous feed 112 may include a first gas stream of the flue gas and a second gas stream of the ambient air during distinct time periods.

As shown in FIG. 1, the first gas-liquid contactor 102 includes a first reactor vessel 144, a first solution inlet 134A, a first solution outlet 134B, a first gas inlet 132A, and a first gas outlet 132B; and the second gas-liquid contactor 106 includes a second reactor vessel 148, a second solution inlet 140A, a second solution outlet 140B, and a second gas outlet 142B. The first and second gas-liquid contactors 102, 106 may include other features and components in some cases.

As shown in FIG. 1, the first and second gas-liquid contactors 102, 106 are connected in series with the slurry processing system 110. In particular, the first solution inlet 134A of the first gas-liquid contactor 102 is fluidically connected to the slurry processing system 110 and is configured to receive a first solution stream 128C from the slurry processing system 110. The first solution stream 128C includes a clarified $CO_2$-lean solution. The first solution outlet 134B of the first gas-liquid contactor 102 is fluidically connected to the slurry processing system 110 and is configured to pass a first mixed stream 126A from the first gas-liquid contactor 102 to the slurry processing system 110. The first mixed stream 126A includes a $CO_2$-rich slurry. The first gas inlet 132A is configured to receive the gaseous feed 112 for performing the absorption reaction; and the first gas outlet 132B is configured to transport a first gas exhaust stream 122 into atmosphere or into another downstream processing system for further processing. In some implementations, the second solution inlet 140A and the second solution outlet 140B of the second gas-liquid contactor 106 are fluidically connected to the slurry processing system 110 via a heat exchanger 114. The heat exchanger 114 receives a second solution stream 128A from the second gas-liquid contactor 106 and a second mixed stream 126B from the slurry processing system 110, transfers heat from the second solution stream 128A to the second mixed stream 126B, and produces a third mixed stream 128B to the slurry processing system 110 and a fourth mixed stream 126C to the second gas-liquid contactor 106.

The second solution stream 128A includes a regenerated $CO_2$-lean solution and the third mixed stream 128B from the heat exchanger 114 to the slurry processing system 110 includes a second solid-enriched $CO_2$-rich slurry. The second gas outlet 142B is configured to transport a second gas exhaust stream 124 containing extracted $CO_2$ with a concentration in a range of 91-100%.

In some implementations, the fresh alkaline capture solution in the first gas-liquid contactor 102 at the beginning of the process is an aqueous solution containing a dissolved salt in a form of a $[Q^+]b[X^-]$ forming an aqueous ionic base. The symbol "$Q^+$" represents a cation species, for example, $NH_4^+$, $N(CH_3)_4^+$, $N(ethyl)_4^+$, $N(Butyl)_4^+$, $N(Propyl)_4^+$, $Li^+$, $K^+$, $Na^+$, $Ca^{2+}$, $Mn^{2+}$, or $Mg^{2+}$. The symbol "$X^-$" represents an anion species, for example, $CO_3^{2-}$, $HCO_3^-$, $OH^-$, $O^{2-}$, $Cl^-$, $Br^-$, or $I^-$. In some implementations, an ionic base includes potassium carbonate, sodium carbonate, ammonium or quaternary ammonium carbonate or their mixtures. The symbols "a" and "b" are integers such that the total charge of the water containing the dissolved salt is neutral. In some instances, the alkaline capture solution may include water, alcohol, glycols, glycerol, polyglycols, glycol ethers, or other chemical operating at any temperature between −10° C. to 70° C. In some instances, water may include tap water, river water, industrial water, desalinated water, water treated via reverse osmosis, distilled water, produced waters from hydrocarbon extraction, treated waste water, deionized water, gray water, brackish water, saline water, or ocean water. In some implementations, the fresh alkaline capture solution includes a weak base of the general formula of $(M)_x(CO_3)_y$, $M^+HCO_3^-$; and/or $M_x(OH)_y$, where M may include potassium (K), sodium (Na), ammonium ($NH_4$), quaternary ammonium, vanadium (V), platinum (Pt), palladium (Pd), rhodium (Rh), ruthenium (Ru), chromium (Cr), copper (Cu), calcium (Ca), lithium (Li), bismuth (Bi), nickel (Ni), cobalt (Co), manganese (Mn), iron (Fe), molybdenum (Mo), or other ions. The weak base in the alkaline capture solution can have a weight concentration in a range of 0.0001-100% in the fresh alkaline capture solution. In some implementations, the alkaline capture solution further includes a free amino acid. A free amino acid may include Sarcosine. In some implementations, the alkaline capture solution also includes any deprotonated amino acids or mixtures of deprotonated amino acids. In some implementations, the fresh alkaline capture solution includes a carboxylic acid salt of an amino acid or a mixture of carboxylic acid salts of amino acids dissolved in water with a weight concentration of 0.0001-100%, 0.001-80%, 0.01-60%, 0.1-

40%, 1-20%, or another range. In some instances, the pH value of the fresh alkaline capture solution is in a range of 8-14.

In some implementations, the fresh alkaline capture solution further includes anti-corrosive agents, surfactants, anti-foaming agents, spectator ions, additives, or promoters. The anti-corrosive agent can be vanadium pentoxide, titanium oxide, arsenic oxide, or other metallic oxides; and the additives or promoters can be MEA (monoethanolamine), DEA (diethanolamine), TEA (triethanolamine), MDEA (methyl diethanolamine), piperazine, or other free amines or mixture of free amines, KVO3 (potassium metavanadate), or another type of material, and may include mixtures or blends of anti-corrosive agents having synergistic properties. The surfactants can be ethoxylates, esters, block copolymers, amine oxides, alkylamine oxides, silicone compounds, fluorinated surfactants, polymeric surfactants, quaternary ammonium surfactants, or other types of surfactants as commonly used in industrial formulation for better gas-liquid or solid-liquid mixing. The surfactants may have hydrophilic or hydrophobic properties, and may include blends of mixtures of individual surfactants having synergistic properties. Surfactants may be of the classes known as nonionic, anionic, cationic, zwitterionic/amphoteric, hydrotropes, emulsifying agents, or other types. The anti-foaming agent can be inert liquid chemicals such as mineral oil, silicon, and/or hydrophobic polyol, a hydrophobic solid, such as hydrophobic silica, ethylene-bis-stearamide, fatty acid, and/or fatty alcohol. In some instances, the anti-foaming agent is insoluble in the alkaline capture solution. In some instances, the anti-foaming agent may be silicone based, or non-silicon based.

In some implementations, the fresh alkaline capture solution includes a phase transfer catalyst or agent with the structure in a form of $c[M^+]d[Y^-]$. The phase transfer catalysts are added to the fresh alkaline capture solution to reduce interfacial surface tension and promote mixing in gas-liquid or gas-liquid-solid systems. The symbol "$M^+$" represents a cation species; and the symbol "$Y^-$" represents an anion species. The symbols "c" and "d" are integers such that the total charge is neutral. In some instances, $M^+$ can be tetrabutyl ammonium, tetramethylammonium, trimethyl butyl ammonium, ethyltrimethyl ammonium, ethyl methyl butyl ammonium, diethyl dimethyl ammonium or other alkylammonium species; and Y− can be hydroxide ($OH^-$), fluorine ($F^-$), carbonate ($CO_3^{2-}$), bicarbonate ($HCO_3^-$), or other anions. In some implementations, a phase transfer catalyst includes tetrabutylammonium hydroxide or trimethyl ethyl ammonium hydroxide. In some implementations, the phase transfer catalyst in the alkaline capture solution has a weight concentration of 0.001-100% or in another range. In some instances, the fresh alkaline capture solution can maintain a $CO_2$ capture rate equal to or greater than 75% of the $CO_2$ capture rate during the first cycle through 10-5000 cycles. In some cases, another catalyst is in the form of $M-O-(OH)_x$ also added along with the phase transfer catalyst, where M is primarily Ti or V but can also be Pt, Pd, Ru, Cu, Al, Cr, Co, Ni, or Mo. This catalyst acts to reduce the desorption temperature. The desorption temperature is between 87° C. and 106° C. in the presence of this catalyst. Without this catalyst, desorption only occurs between 106° C. to 116° C.

During absorption, $CO_2$ dissolves into the liquid, transiently binds a promoter (P) to form a $P-CO_2$ complex, and transfers to the dissolved metal carbonate $M_x(CO_3)_y$ to form metal bicarbonate $M_x(HCO_3)_y$ while regenerating the promoter (P). In some instances, a promoter includes one or more of the following N-methylglycine (Sarcosine), N,N-dimethylglycine (DMG), or Glycine as a free amino acid or their mixture, a carboxylic acid salt of any amino acid, a potassium, sodium or quaternary ammonium carboxylic acid salts of N-methylglycine (Sarcosine), N,N-dimethylglycine or Glycine or their mixture, any deprotonated amino acids and their mixture, as a promoter. During desorption, the bicarbonate decomposes back to carbonate, releasing $CO_2$ (and $H_2O$) so the absorbent is restored for another cycle. This process may be expressed in equations below.

$$CO_2(g) \Leftrightarrow CO_2(l)$$

$$CO_2(l) + P(l) \Leftrightarrow P\text{-}CO_2 \text{ complex}(l)$$

$$P\text{-}CO_2 \text{ complex}(l) + M_x(CO_3)_y \Leftrightarrow 2M_x(HCO_3)_y(l) + P(l)$$

$$M_x(HCO_3)_y \Leftrightarrow M_x(CO_3)_y + CO_2(g) + H_2O(g)$$

where P=promoter.

As shown in FIG. 1, the first gas-liquid contactor 102 includes one or more monitoring units 152 which may include a pH sensor, a $CO_2$ sensor, a temperature sensor, or a combination of these or other types of sensors. The monitoring unit 152 is communicatively connected to a control system 156 which can be used to read signals from the monitoring unit 152 and to determine the characteristics of the liquid in the first gas-liquid contactor 102, e.g., the pH value, the $CO_2$-rich complex concentration, the temperature, the concentration of dissolved $CO_2$, or other characteristics of the liquid in the first gas-liquid contactor 102. In some instances, the first gas-liquid contactor 102 may include multiple monitoring units 152. In some instances, the first gas-liquid contactor 102 may include other types of sensors to monitor liquid level, flow rate, purity, density, weight, and other operation conditions. In some instances, the monitoring devices 152 may include measurement or analytical instrumentation such as in-situ Raman or infrared (IR) spectroscopy for yield sensing, gas chromatography, mass spectrometry, an autotitrator, or other types of monitoring devices.

In some instances, the fraction and particle size distribution of precipitated reaction products in the $CO_2$-rich slurry formed in the first gas-liquid contactor 102 can be monitored. For example, a density measurement using Raman spectroscopy, Infrared (IR) spectroscopy, FTIR spectroscopy, light scattering and diffraction method, turbidity measurement, mass balance, etc. can be used can be used in characterization of the $CO_2$-rich slurry in the first gas-liquid contactor 102.

In some instances, the first gas-liquid contactor 102 may include other components or elements. For example, the first gas-liquid contactor 102 may include a pump, an air mover, a demister, filters or screens to remove debris or airborne solids, and other components. Components of the first gas-liquid contactor 102 may be communicably connected to and controlled by the control system 156. For example, the first gas-liquid contactor 102 can include a pump that circulates the $CO_2$-rich slurry through the interfacial surface structure 116 in the first gas-liquid contactor 102 during the first time period for absorbing $CO_2$ from the gaseous feed 112. For another example, the air mover that directs the flow of the gaseous feed 112 can be stopped, for example, when the concentration of the precipitated reaction products in the $CO_2$-rich slurry in the first gas-liquid contactor 102 reaches a predetermined threshold value. The first gas-liquid contactor 102 may include another pump, which can be activated to pump the first mixed stream 126A to transfer the $CO_2$-rich slurry from the first gas-liquid contactor 102 to the slurry processing system 110. In some instances, the control system 156 may be configured to perform other control operations.

In some implementations, the $CO_2$-rich slurry is then directed to and processed in the slurry processing system 110 which is fluidically connected between the first and second gas-liquid contactor 102, 106. In some implementations, the slurry processing system 110 is configured to increase a weight percentage of the precipitated reaction products in the $CO_2$-rich slurry received from the first gas-liquid contactor 102 prior to being directed to the second gas-liquid contactor 106 for the desorption reaction. In certain examples, the slurry processing system 110 can output at least one clarified $CO_2$-lean solution and at least one solid-enriched $CO_2$-rich slurry based on the $CO_2$-rich slurry received from the first gas-liquid contactor 102. In some implementations, the at least one clarified $CO_2$-lean solution containing the dissolved reaction products can be communicated back to the first gas-liquid contactor 102 for continuing with the absorption reaction to further capture $CO_2$ from the gaseous feed 112 and to form solid precipitates; and the at least one solid-enriched $CO_2$-rich slurry containing the precipitated reaction products can be communicated to the second gas-liquid contactor 106 for the desorption reaction to extract the captured reaction products (e.g., the dissolved and/or precipitated reaction products). In certain instances, the slurry processing system 110 includes liquid-solid separation units to perform multistage enrichment of solid in the upstream and clarification of solution in the downstream. In some instances, the types of liquid-solid separation units may be determined based on the concentration of the dissolved reaction products and the concentration of the precipitated reaction products in an input stream, the temperature of the input stream, the flow rate, output requirements, and other conditions.

In some instances, the slurry processing system 110 may include various liquid-solid separation units connected in parallel, in series or a combination to perform multi-staged separation. In some implementations, the slurry processing system 110 includes one or more gravity-driven separation units, each of which separates solid from liquid based on gravity or gravitational force. For example, each gravity-driven separation unit may be implemented as a spiral classifier, a lamella clarifier, a rake classifier, a gravity belt thickener, a drum filter, a settling tank/classifier, a sedimentation basin, or another type of gravity-driven separation unit. In some instances, a gravity-driven separation unit relies primarily on density differences and natural settling under gravity to separate solids from liquids, making it well-suited for handling coarser particles, high solids loads, and continuous, gentle processing with relatively low energy consumption. In some instances, the gravity-driven separation unit may be implemented as the gravity-driven separation unit 204, 206, 302 in the example slurry processing systems 200 220, 230, 300 in FIGS. 2A-2C, 3A or in another manner. In some implementations, the slurry processing system 110 operates at a temperature in a range of −10 to 70° C.

In some implementations, the slurry processing system 110 includes multiple gravity-driven separation units connected to one another in series. For example, a first gravity-driven separation unit may be directly connected to the first gas-liquid contactor to receive the $CO_2$-rich slurry. The first gravity-driven separation unit at the initial stage may include a passive separation unit (no power consumption). In some implementations, the gravity-driven separation unit at the initial stage is configured to provide a location to hold supersaturated liquid for a time until precipitation occurs and for precipitation reaction products to gather for easier, localized collection. In some instances, the gravity-driven separation unit at the initial stage may be configured to provide other functions. In some instances, the gravity-driven separation unit at the initial stage may be periodically rinsed to dislocate the concentrated solid precipitates into another liquid-solid separation unit (e.g., a second gravity-driven separation unit) for further processing.

In some instances, the slurry processing system 110 includes one or more centrifugal force-driven separation units, each of which is configured to separate solid from liquid based on centrifugal acceleration. For example, the centrifugal force-driven separation unit may be implemented as a hydrocyclone, a centrifuge/decanter, rotary vacuum drum filter, cyclonic separators, and another type of centrifugal force-driven separation unit. In some instances, a centrifugal force-driven separation unit utilizes high rotational or tangential velocities to generate centrifugal acceleration, forcing denser solids outward while lighter liquid moves inward, which allows rapid separation of fine particles, high throughput, and compact design, but typically with higher energy requirements and sensitivity to slurry properties. In some instances, the centrifugal force-driven separation unit may be implemented as the centrifugal force-driven separation unit 208 in the example slurry processing systems 200 220, 322A, 322B in FIGS. 2A-2B, 3B or in another manner.

In some implementations, the slurry processing system 100 includes components or devices that can facilitate the formation of new solid precipitates. In some instances, new solid precipitates can be formed by inducing changes in temperature, concentration, or chemical environment. For example, temperature swing or cooling, e.g., when flowing through a heat exchanger, can reduce the solubility of certain species, promoting crystallization and solid formation, while evaporation of the solvent increases solute concentration to exceed saturation, triggering precipitation. Additionally, pH adjustment or chemical additives can alter the solubility of specific ions, causing selective precipitation of targeted compounds. Other techniques, such as seeding with solid nuclei, can further facilitate controlled crystallization, while supersaturation management through flow or mixing patterns can enhance particle size control and uniformity of the precipitates. These approaches enable the generation of solid phases from solution streams and increase solid concentration in mixed streams for subsequent separation, collection, or subsequent processing. In some implementations, the slurry processing system 110 includes one or more solid precipitate forming units. In some instances, a solid precipitate forming unit may be implemented as a heat exchanger, an evaporative crystallizer, a forced-circulation crystallizer, a chemical dosing tank, or another type of solid precipitate forming unit.

As shown in FIG. 1, the slurry processing system 110 is configured to receive a first input mixed stream 126A from the first gas-liquid contactor 102 and pass a first output mixed stream 126B to the second gas-liquid contactor 106 via a heat exchanger 114. The slurry processing system 110 is also configured to receive a second input mixed stream 128B from the heat exchanger 114 and pass an output solution stream 128C to the first gas-liquid contactor 102. In some instances, the weight percentage of the precipitated reaction products in the first output mixed stream 126B is greater than that in the first and second input mixed streams 126A, 128B; and the first output mixed stream includes a solid-enriched $CO_2$-rich slurry. In some instances, the weight percentage of the precipitated reaction products in the output solution stream 128C is less than that in the first and second input mixed streams 126A, 128B; and the output solution stream 128C includes a clarified $CO_2$-lean solution with negligible concentration of solid precipitates.

In some implementations, a mixed stream (e.g., the streams 126A, 126B, 126C, 128B, 212, 212M, 216, 216S, 216M, 218, 218S, 312, 312S, 316, 324, 324S, 326S, 326M as shown in FIGS. 1, 2A-2C, 3A-3B) is a flow of a heterogenous mixture containing materials of both liquid and solid phases, e.g., the dissolved and precipitated reaction products. A mixed stream includes non-negligible level of solid precipitates. A concentration of precipitated reaction products in a mixed stream is greater than 0.5 wt % and less than 60 wt %. In some implementations, a solution stream (e.g., the streams 128A, 128C, 214, 216L, 218L, 212L, 324L, 326L as shown in FIGS. 1, 2A-2C, 3A-3B) is a flow of a homogenous solution containing materials of primarily liquid phase, e.g., the dissolved reaction products and salts/additives (solutes). A solution stream includes no solid precipitates or a negligible level of solid precipitates. A concentration of precipitated reaction products in a solution stream is negligible, substantially negligible, and approximately zero. In some instances, a concentration of precipitated reaction products in a solution stream is less than a threshold value of 0.5 wt %.

In some instances, the example slurry processing system 110 can provide improved energy efficiency by reducing the total energy input needed per a unit weight of removed $CO_2$ gas; and thus, can reduce the total cost of the $CO_2$ separation process. In some implementations, the slurry processing system 110 is configured to increase the concentration of precipitated reaction products that goes to the second gas-liquid contactor 106. In some instances, the slurry processing system 110 can result in less energy used in second gas-liquid contactor for extracting $CO_2$ from the captured reaction products; can also lower flow rates required on downstream; and can improve $CO_2$ capture rates upstream by shifting the reaction equilibrium. In some instances, the example slurry processing system 110 can decouple upstream and downstream performance. For example, weather and environmental conditions can affect $CO_2$ capture rates. The slurry processing system 110 can buffer upstream process based on an open system, variation in operation conditions, productivity, etc. from the downstream process based on a closed system and energy consuming.

In some implementations, the first output mixed stream 126B includes a solid-enriched $CO_2$-rich slurry produced based on the $CO_2$-rich slurry received from the first gas-liquid contactor 102 in the first input mixed stream 126A. In some instances, the first output mixed stream may include a solid-enriched $CO_2$-rich slurry produced based on a solid-enriched $CO_2$-rich slurry received in the second input mixed stream 128B. In some instances, the first solid-enriched $CO_2$-rich slurry in the first output mixed stream 126B may include a concentration of the precipitated reaction products in a range of 30-80 wt % and a concentration of the dissolved reaction products in a range of 0.2-5 wt %. In some implementations, a value of the molar conversion is in a range of 50-95%. The temperature of the first output mixed stream 126B is in a range of 20-60° C. before the heat exchanger 114 and in a range of 60-100° C. after the heat exchanger 114. In some implementations, the output solution stream 128C includes a clarified $CO_2$-lean solution produced based on the $CO_2$-rich slurry received in the first input mixed stream 126A. In some instances, the output solution stream 128C also includes a clarified $CO_2$-lean solution produced based on the solid-enriched $CO_2$-rich slurry received in the second input mixed stream 128B. In some instances, the clarified $CO_2$-lean solution in the output solution stream 128C may include a concentration of the dissolved reaction products of up to 60 wt % and a concentration of the precipitated reaction products in a range of 0.001-1 wt %. A value of the molar conversion is in a range of 2-10%. The temperature of the clarified $CO_2$-lean solution stream 128B may be in a range of 0-50° C. The precipitated reaction products in the clarified $CO_2$-lean solution stream 128B may include particles with a size smaller than 200 micrometers.

In some implementations, the second gas-liquid contactor 106 is a multi-tray stripping or desorption column to extract $CO_2$ from the dissolved and/or precipitated reaction product in the solid-enriched $CO_2$-rich slurry, produce pure or high-purity $CO_2$ gas during desorption, and from a regenerated $CO_2$-lean solution which can be feedback to the slurry processing system 100. The heat exchanger 114 receives the mixed stream 126B and outputs mixed stream 126C which has a higher temperature than the mixed stream 126B. In some instances, the second-liquid contactor 106 can receive the mixed stream 126C from the heat exchanger 114. In some instances, the second gas-liquid contactor 106 may include industrial moisture recovery systems (e.g., the condenser/reflux drum) to condense water vapor back into liquid form and prevent water loss.

In some instances, the second gas-liquid contactor 106 includes components and devices (e.g., reboiler, electrical heater, etc.) that are configured to heat the solid-enriched solution in the second gas-liquid contactor 106 to a temperature less than 200 degrees Celsius, e.g., in a range of 90-150° C., to release at least a portion of the captured reaction products from the solid-enriched $CO_2$-rich slurry with a conversion efficiency in a range of 30-100% and a selectivity in a range of 93-100%. In some implementations, heat received by the $CO_2$-rich slurry in the second gas-liquid contactor 106 causes at least a portion of $CO_2$ released from the $CO_2$-rich slurry. In some instances, the second gas-liquid contactor 106 may be also heated in another manner. For example, the second gas-liquid contactor 106 may be heated by a jacket which may be powered by hot water, hot brine, or steam from a heat source. For another example, the second gas-liquid contactor 106 may be heated by other energy source powered by renewable electricity (e.g., electricity generated by solar panels, wind turbines, or other clean energy conversion devices and stored in various energy storage systems or devices). The gas exhausted from the second gas outlet 142B includes $CO_2$ gas with a concentration in a range of 91-100%. The gas exhaust from the second gas outlet 142B may be collected and compressed for geological sequestration beverage carbonation, as a low-GWP (Global Warming Potential) refrigerant, and dry ice for cooling/cleaning; in welding, lasers, and fire suppression; for greenhouse enrichment and medical insufflation; and as a feedstock/solvent in chemicals (urea, soda ash, supercritical extraction, methanol) and carbon-mineralized building materials, or utilization in other applications.

During the release of $CO_2$ gas from the desorption reaction in the second gas-liquid contactor 106, a solution that includes supersaturated, near-saturated concentration of dissolved reaction products is produced (e.g., the regenerated $CO_2$-lean solution). In some instances, the regenerated $CO_2$-lean solution may include a homogenous liquid solution at the desorption temperature, which may be equivalent to 0-40 wt % of precipitated reaction products if the solution were cooled to absorption operating temperatures. In some instances, the regenerated $CO_2$-lean solution from the second gas-liquid contactor 106 has a pH value in a range of 8-14. In some implementations, the regenerated $CO_2$-lean solution at the second solution outlet 140B has a temperature greater than the solid-enriched $CO_2$-rich slurry received at the second solution inlet 140A of the second vessel 148. The regenerated $CO_2$-lean solution in the output solution stream 128A can be circulated back to the heat exchanger 114 to cool down, which allows the formation of solid precipitates and produces a solid-enriched $CO_2$-rich slurry in the second input mixed stream 128B. The solid-enriched $CO_2$-rich slurry in the second input mixed stream 128B can be further processed, e.g., enrichment of solid precipitates and clarification of solution, by operation of the slurry processing system 110.

At the beginning (to) of the $CO_2$ separation process, a fresh alkaline capture solution can be used to wet the surfaces of the interfacial surface structure in the first gas-liquid contactor 102. The gaseous feed 112 can be simultaneously supplied to the first gas-liquid contactor 102. As the absorption reaction proceeds, the concentration of the captured reaction products in the form of dissolved reaction products increases until saturation and precipitated reaction products start to form on surfaces of the interfacial surface structure, producing the $CO_2$-rich slurry. After running the system for a certain amount of time depending on the flow rate of the gaseous feed, environmental conditions, etc., the concentration of the dissolved reaction products can be increased to a saturation point; and further reaction can cause the dissolved reaction products can precipitate out forming the precipitated reaction products. During the absorption reaction when operating at steady state, the interfacial surface structure in the first gas-liquid contactor 102 can be wetted by the clarified $CO_2$-lean solution received from the slurry processing system 110; the flow from the gaseous feed 112 is directed across the interfacial surface structure in the first gas-liquid contactor 102; and at least a portion of the $CO_2$ in the gaseous feed 112 diffuses into the clarified $CO_2$-lean solution on the surfaces of the interfacial surface structure. The $CO_2$ concentration in clarified $CO_2$-lean solution increases over time forming the $CO_2$-rich slurry. In some implementations, solid precipitates are formed on the surfaces of the interfacial surface structure in the first gas-liquid contactor. In some implementations, the concentration of the captured reaction products in the $CO_2$-rich slurry becomes greater than that of the clarified $CO_2$-lean solution. In some instances, during operation, precipitated reaction products can be formed in the first gas-liquid contactor 102; and in this case, the $CO_2$-rich slurry in the first output mixed stream 126A contains solid precipitates. The overall molar conversion of the $CO_2$-rich slurry with precipitated and dissolved reaction products in the first output mixed stream 126A may reach about 5-95% or another value.

As shown in FIG. 1, the first input mixed stream 126A is transferred into the slurry processing system 110 to produce the solid-enriched $CO_2$-rich slurry in the first output mixed stream 126B and the clarified $CO_2$-lean solution in the output solution stream 128C. In some instances, the solid-enriched $CO_2$-rich slurry in the first output mixed stream 126B can be heated up by operation of the heat exchanger 114 prior to being passed to the second gas-liquid contactor 106. In this case, the weight percentage of the precipitated reaction in the mixed stream 126C after the heat exchanger 114 can be less than that of the mixed stream 126B due to the improved solubility. The mixed stream 126C can be directed through the second gas-liquid contactor 106, where at least a portion of the captured reaction products in the solid-enriched $CO_2$-rich slurry is removed. In some instances, the mixed stream 126C when reaching the second gas-liquid contactor 106 also contains liquid with dissolved reaction products.

In some instances, before the desorption reaction in the second gas-liquid contactor 106, the mixed stream 126B containing the solid-enriched $CO_2$-rich slurry can be heated by operation of the heat exchanger 114, The heat exchanger 114 is configured to receive the solution stream 128A and the mixed stream 126B; recycle at least a portion of the heat in the solution stream 128A; transfer heat from the solution stream 128A to the mixed stream 126B; and output a mixed stream 128B to the slurry processing system 110 and a mixed stream 126C to the second gas-liquid contactor 106. The temperature of the solution stream 128A before the heat exchanger 114 may be in a range of 100-130° C.; and the temperature of the mixed stream 128B after the heat exchanger 114 may be in a range of 30-70° C. The solution stream 128A before the heat exchanger 114 is a supersaturated solution with a negligible amount of solid precipitates. The temperature swing causes the concentration of the solid precipitates to increase, the heat exchange 114 outputs a mixed stream 128B. In some implementations, the mixed stream 128B after the heat exchanger 114 includes solid precipitates of up to 20 wt %. The solid precipitates in the mixed stream 128B may have a size less than 100 micrometers and may be up to 2000 micrometers depending on equipment tolerance and capability. In some instances, the heat exchanger 114 may have a shell-tube structure, a stacked-plate structure, double pipe structure, or another structure.

In some implementations, the gas output stream 124 of the second gas-liquid contactor 106 includes $CO_2$ gas having a purity in a range of 91-100-wt % or another range. In some instances, subsequently the $CO_2$ gas may optionally be purified, for example via dehydration, filtration via activated carbon, liquefied, or otherwise treated to remove undesirable contaminants. The $CO_2$ gas obtained during the desorption process may be compressed and used as a low global warming refrigerant, in green houses for enhanced productivity, welding, feedstock for urea and to other useful chemicals and/or liquid fuels, to provide low global warming heating or cooling, used as feedstock for urea other useful chemicals, fuels, concrete/cement, as a blowing agent, carbonated beverages, in greenhouses for nursery and vegetation, or sequestered underground in geological formations or offshore or onshore depleted oil fields where the $CO_2$ gas can be stored (e.g., geological sequestration), or in other applications.

The pH value of the $CO_2$-rich slurry in the first gas-liquid contactor 102 can be monitored in real-time or periodically, by operation of the monitoring unit 152. In some examples, the $CO_2$-rich slurry has a pH in a range of 7-11. In response to the $CO_2$-rich slurry meeting one or more predetermined criteria, e.g., the concentration of the precipitated reaction products in the $CO_2$-rich slurry being greater than a predetermined concentration threshold value or being within a concentration range, the density of the first input stream 126A being greater than a predetermined density threshold value, the gaseous feed 112 can be stopped and a system rinse or water top-off process in the first gas-liquid contactor 102 can be initiated. In some instances, the first gas output stream 122 may include $CO_2$-stripped air, $N_2$ and $O_2$, or other gas.

In some instances, the example carbon dioxide capture and separation system 100 may include various solution handling components, including spray head, nozzles, valves, pumps, pipes, air movers, etc. for controlling the flow of liquids and gases. In some instances, the carbon dioxide capture and separation system 100 includes a heating unit for heating the solution in the second gas-liquid contactor 106. In some instances, the control system 156 is configured to communicate with the monitoring unit 152 and the various fluid handling components (e.g., the pump 108), the heating unit of the second gas-liquid contactor 106 for controlling the desorption reaction in the second gas-liquid contactor 106. In some implementations, the control system 156 may include computation apparatus, a memory unit, an input/output interface, or other components that allow the communication of the control system with other components of the example carbon dioxide capture and separation system 100, determine control parameter values of the components of the example carbon dioxide capture and separation system 100, and optimize the carbon dioxide removing performance of the example carbon dioxide capture and separation system 100. In some instances, the control system may be configured for performing other functions.

Figure 2A:
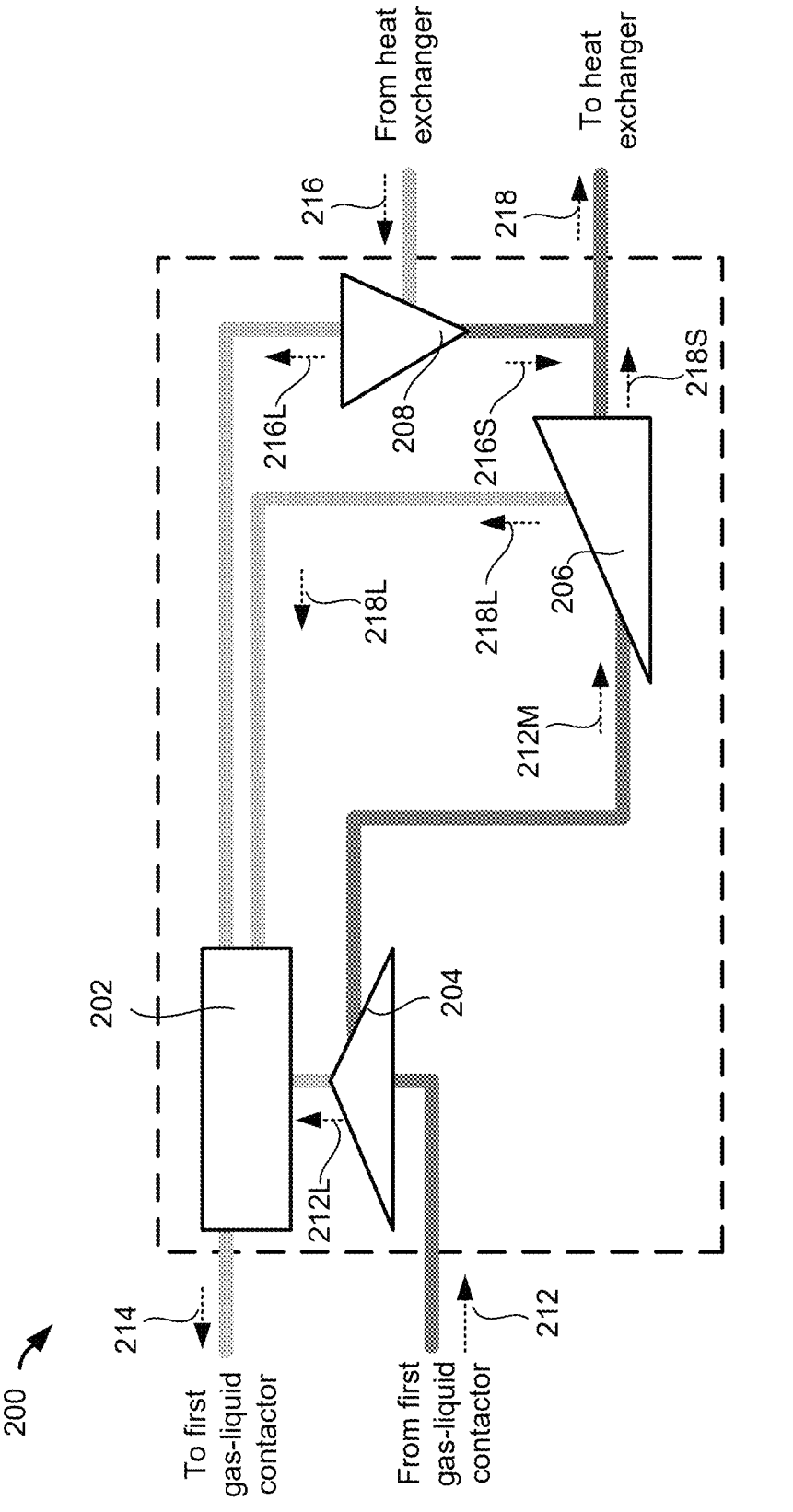
FIGS. 2A-2C include schematic diagrams showing aspects of example slurry processing systems.
Figure 2B:
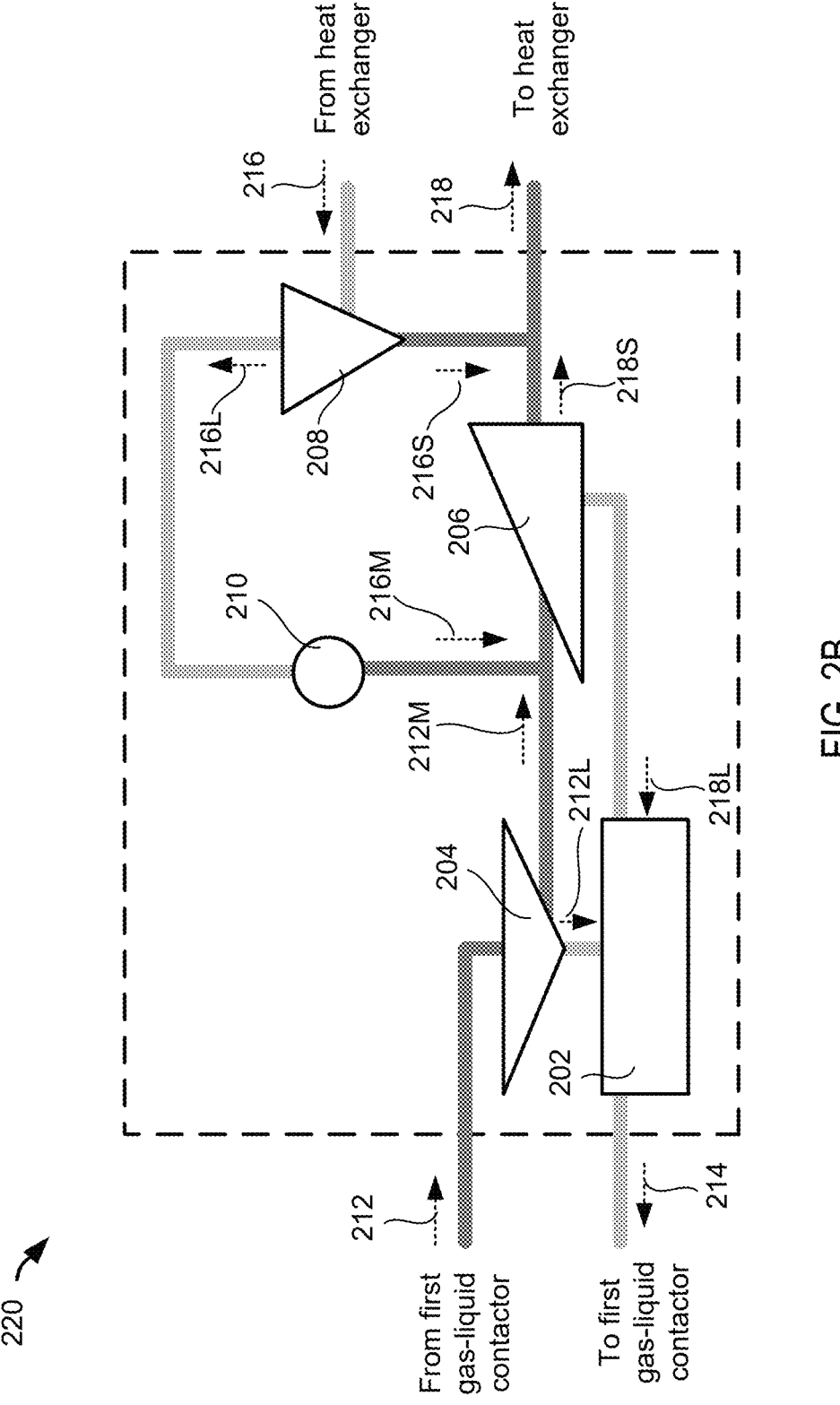
Figure 2C:
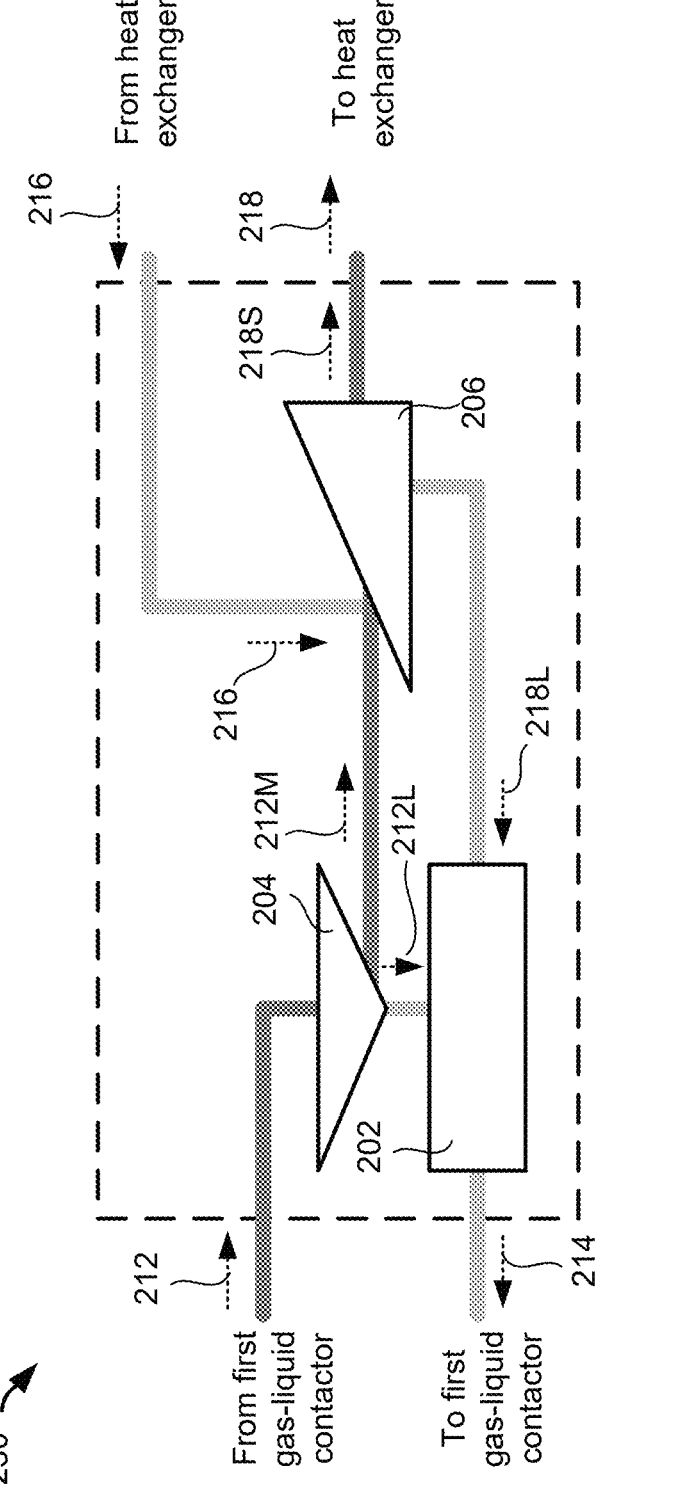

FIGS. 2A-2C include schematic diagrams showing aspects of example slurry processing systems 200, 220, 230. In some instances, the example slurry processing systems 200, 220, 230 may be part of a carbon dioxide capture and separation system (e.g., the carbon dioxide capture and separation system 100 shown in FIG. 1). In some instances, the slurry processing system 200, 220, 230 can be connected between upstream and downstream gas-liquid contactors of a carbon dioxide capture and separation system (e.g., the first and second gas-liquid contactor 102, 106 in the example carbon dioxide capture and separation system 100 in FIG. 1). In some implementations, the slurry processing systems 200, 220, 230 can increase the concentration of precipitated reaction products in a $CO_2$-rich slurry received from the upstream process and produce a solid-enriched $CO_2$-rich slurry for the downstream process. The slurry processing system 200, 220, 230 can also produce a clarified $CO_2$-lean solution for the upstream process based on the $CO_2$-rich slurry received. In some instances, the slurry processing system 200, 220, 230 can produce solid-enriched $CO_2$-rich slurry and clarified $CO_2$-lean solution based on the mixed stream received from downstream processes.

As shown in FIGS. 2A-2C, each of the example slurry processing systems 200, 220, 230 includes a solvent tank 202, a first gravity-driven separation unit 204, and a second gravity-driven separation unit 206. For example, each gravity-driven separation unit 204, 206 may be implemented as a spiral classifier, a rake classifier, a settling tank/classifier, a sedimentation basin, a gravity belt thickener, a drum filter, or another type of gravity-driven separation unit. As shown in FIGS. 2A-2B, each of the slurry processing systems 200, 220 further includes a centrifugal force-driven separation unit 208. For example, the centrifugal force-driven separation unit 208 may be implemented as a hydrocyclone, a centrifuge/decanter, rotary vacuum drum filter, cyclonic separators, and another type of centrifugal force-driven separation unit. As shown in FIG. 2B, the slurry processing system 220 includes a heat exchanger 210. In some instances, the slurry processing systems 200, 220, 230 include solution handling components and devices. For example, the slurry processing systems 200, 220, 230 include pumps, pipes, valves, etc. for controlling the flow of solution streams between the various components/devices in the slurry processing system 200, 220, 230 or controlling the fluid communication with other components/devices of the carbon dioxide capture and separation system. In some instances, the slurry processing systems 200, 220, 230 may include other components, devices and components may be connected and operated in another manner.

In some instances, the first gravity-driven separation unit 204 may have a similar function as the interfacial surface structure in the first gas-liquid contactor 102 and may be contained within the first gas-liquid contactor 102. For example, the first gravity-driven separation unit 204 may include a filter unit made of nylon, fiberglass, aluminum, steel, PVC, etc. and may have a mesh structure with a pore size in a range of 25-200 micrometers. The filter unit may be used as a precipitation initiation surface. In some instances, the first gravity-driven separation unit 204 may be part of the interfacial surface structure (implemented as a high surface online filter) in the first gas-liquid contactor 102, e.g., a section of the interfacial surface structure where solid precipitates preferentially gather. In some instances, the first gravity-driven separation unit 204 may be a retention surface separated from the interfacial surface structure that promotes solid precipitation via residence time and evaporation. The solid precipitates formed on the first gravity-driven separation unit 204 or the interfacial surface structure may not re-dissolve back into the bulk solution.

As shown in FIGS. 2A-2C, each of the slurry processing system 200, 220, 230 is configured to receive a first input mixed stream 212 from an upstream gas-liquid contactor (e.g., the first gas-liquid contactor 102 in FIG. 1) and pass a first output mixed stream 218 to a downstream gas-liquid contactor (e.g., the second gas-liquid contactor 106 in FIG. 1), via a heat exchanger (e.g., the heat exchanger 114 in FIG. 1). Each of the slurry processing systems 200, 220, 230 is also configured to receive a second input mixed stream 216 from the heat exchanger, and pass an output solution stream 214 to the upstream gas-liquid contactor.

In some implementations, the first input mixed stream 212 from the first gas-liquid contactor contains a $CO_2$-rich slurry; and includes captured reaction products which are in the form of dissolved reaction products and precipitated reaction products. The weight percentage of the precipitated reaction products in the first input mixed stream 212 is in a range of 0.001-10 wt %. The first input mixed stream 212 is fed into the first gravity-driven separation unit 204, which has openings between 25 and 200 micrometers in length that allow smaller particles to pass. Within the first gravity-driven separation unit 204, the solids are partially retained, resulting in two output streams: mixed stream 212M, containing a higher concentration of solid precipitates relative to mixed stream 212, and solution stream 212L, containing a reduced concentration of solid precipitates and primarily composed of a clarified solution. This separation allows controlled separation of solids from the feed stream while maintaining the flow of the liquid phase. Solution stream 212L is then passed to the first gas-liquid contactor 102 directly or via a solvent tank 202. Solution stream 212L is a saturated solution containing <0.1 wt % solids that have passed through the first gravity-driven separation unit 204. Solution stream 212L has the same properties as the stream 128C. Mixed stream 212M is produced by mechanical displacement, e.g. spraying or flooding, using the first input mixed stream 212. Mixed stream 212M includes 1-30 wt % precipitated reaction products, while the remainder is a liquid saturated capture solution, which itself contains 1-8 wt % dissolved reaction products. The solid precipitates in mixed stream 212M have a size in a range of 25-3000 micrometers. A value of the molar conversion is in a range of 5-45%.

As shown in FIGS. 2A-2C, mixed stream 212M is then passed from the first gravity-driven separation unit 204 to the second gravity-driven separation unit 206. The second gravity-driven separation unit 206, up on receiving mixed stream 212M, produces mixed stream 218S containing a higher concentration of solid precipitates relative to that in mixed stream 212M, and solution stream 218L containing a reduced concentration of solid precipitates than that of mixed stream 212M. Solution stream 218L includes a saturated solution containing less than 1 wt % precipitated reaction products that overflow into the solvent tank 202 or directly back to the first gas-liquid contactor 102. Mixed stream 218S includes precipitated reaction products having a concentration in a range of 50-90 wt %. A value of the molar conversion is in a range of 50-95%. The temperature of mixed stream 218S is in a range of 5-50° C. The size of the solid precipitates in mixed stream 218S may be in a range of 10-5000 micrometers. Solution stream 218L is directed back to the upstream process via the solvent tank 206 where solution streams 212L, 218L are merged. The merged solution as part of the first output solution stream 214 is then passed back to the first gas-liquid contactor of the carbon dioxide capture and separation system. In some instances, solution streams 212L may have the same properties as the streams 128C, 214 in FIGS. 1, 2A-2C.

In some instances, the first gravity-driven separation unit 204 may be rinsed to remove precipitate particles. For example, the rinsing process may be triggered by a constant time interval, a low flow rate measurement in mixed stream 212M (implying high filter impedance), or a mass threshold. In some instances, water, fresh alkaline capture solution, or other liquid can be used to rinse the first gravity-driven separation unit 204.

As shown in FIGS. 2A-2B, the second input mixed stream 216 from the heat exchanger containing both liquid with the dissolved reaction products and suspended solids including the precipitated reaction products is fed to the centrifugal force-driven separation unit 208. In some implementations, the centrifugal force-driven separation unit 208 is configured to filter the second input mixed stream 216 into two streams: mixed stream 216S that contains mainly solid particles smaller than 1000 micrometers and at a concentration of 30-70 wt %. The separation cutpoint between 5-50 micrometer; and the temperature of mixed stream 216S is in a range of 20-60° C. Mixed stream 216S, which may have a molar conversion of about 40-95% can be merged with mixed stream 218S from the second gravity-driven separation unit 206 and passed as part of the first output mixed stream 218 to the heat exchanger.

Solution stream 216L departing from the centrifugal force-driven separation unit 208 contains a clarified $CO_2$-lean solution produced based on the solid-enriched $CO_2$-rich slurry in mixed stream 216. The solution stream 216L has a lower molar conversion of around 0-25%, which can be passed back to the first gas-liquid contactor for further absorption reaction. As shown in FIG. 2A, solution stream 216L departing from the centrifugal force-driven separation unit 208 is passed to the first gas-liquid contactor for the absorption reaction directly or via the solvent tank 202 (e.g., merge with streams 212L and 218L from the first gravity-driven separation unit 204 and the second gravity-driven separation unit 206). In this case, the first output solution stream 214 also includes a portion of the clarified $CO_2$-lean solution from solution stream 216L from the centrifugal force-driven separation unit 208. Solution stream 216L in FIG. 2A contains mainly liquid and solid particles below the diameter cutoff point (e.g., 100 micrometers) at a concentration of 0.1-3 wt %. Solution stream 216L may have a temperature in a range of 20-60° C. A value of the molar conversion is less than 50%.

As shown in FIG. 2B, solution stream 216L departing from the centrifugal force-driven separation unit 208 can be further cooled down by a heat exchanger 210 and produce mixed stream 216M containing a higher concentration of solid precipitates (e.g., 1-40 wt %) relative to that in solution stream 216L (e.g., <5 wt %) caused by the change in temperature and thus in solubility. Mixed stream 216M has a temperature in a range of 0-40° C.; and a value of the molar conversion is in a range of 5-50%. The slurry processing system 220 may be operated such that the second input mixed stream 216 enters at an above-ambient temperature that results in a precipitated reaction product concentration near the maximum tolerable solid loading of the centrifugal force-driven separation unit 208. Afterwards, the heat exchanger 210 reduces the temperature of solution stream 216L to initiate additional precipitation. Mixed stream 216M is then merged with mixed stream 212M from the first gravity-driven separation unit 204 and passed to the second gravity-driven separation unit 206 for further solid enrichment. In this case, solution stream 218L includes a clarified $CO_2$-lean solution from mixed stream 216M; and mixed stream 218S includes solid precipitates from mixed stream 216M.

As shown in FIG. 2C, the second input mixed stream 216 can be directed directly to the inlet of the second gravity-driven separation unit 206. For example, when the second gas-liquid contactor 106 has a high conversion extent, which reduces the presence of bicarbonate to less than 10 wt %, the centrifugal force-driven separation unit 208 may not be required for processing the second input mixed stream 216.

Figure 3A:
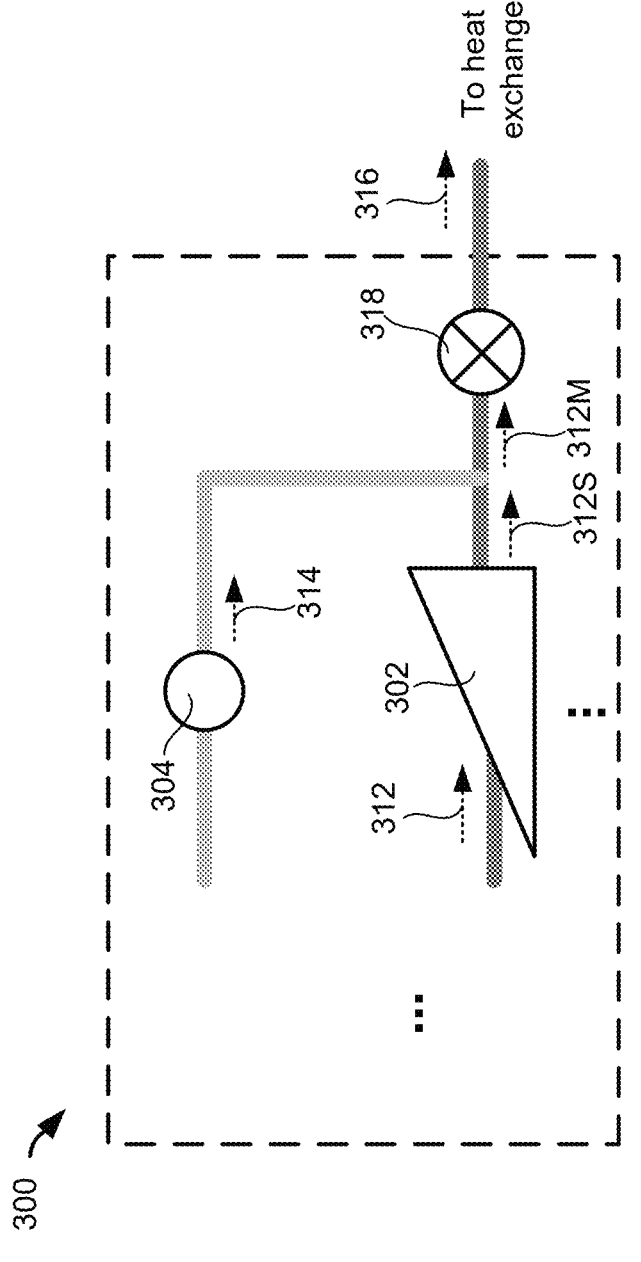
FIGS. 3A-3B include schematic diagrams showing aspects of example slurry processing systems.
Figure 3B:
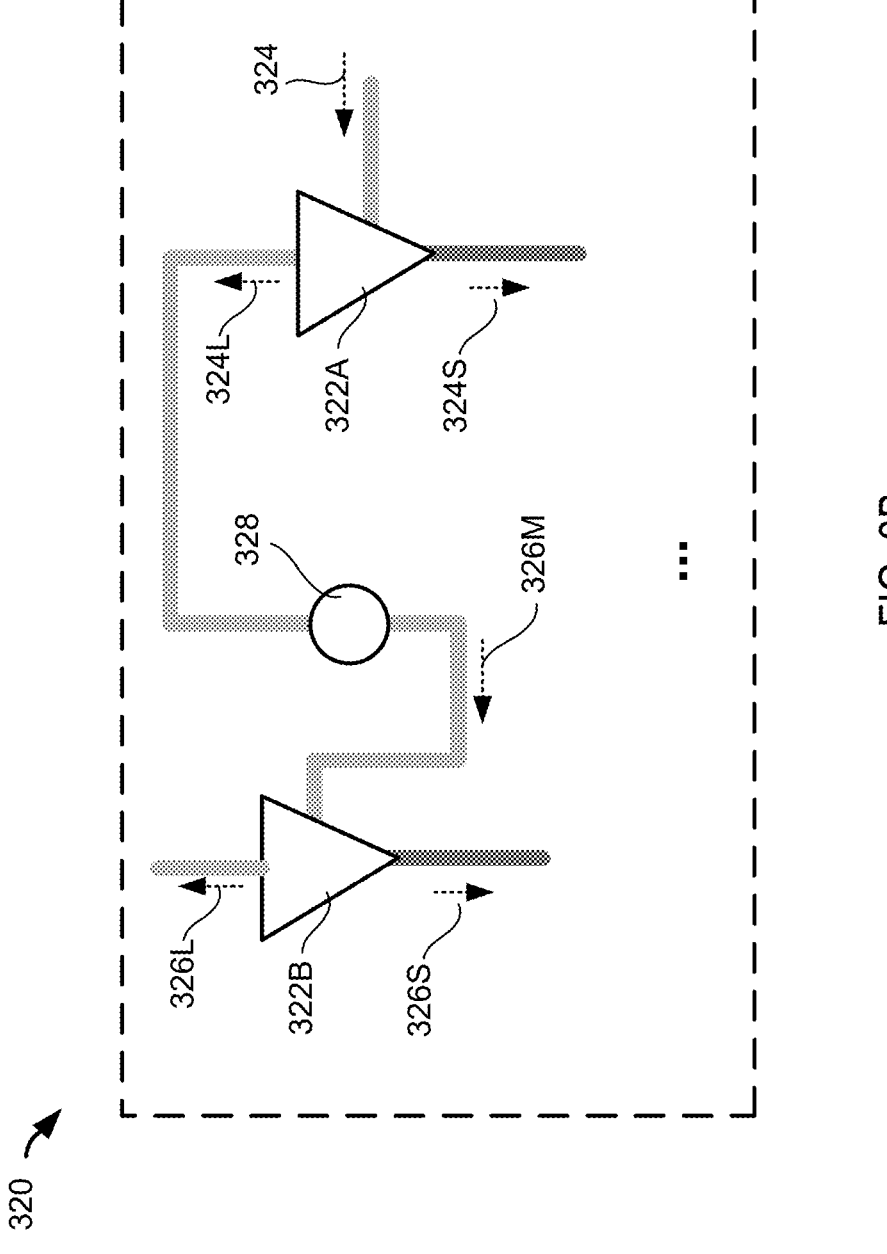

FIGS. 3A-3B include schematic diagrams showing aspects of example slurry processing systems 300, 320. Each of the slurry processing systems 300, 320 may further include components and devices shown in FIGS. 2A-2C or in another manner. In some instances, the example slurry processing systems 300, 320 may be part of a carbon dioxide capture and separation system (e.g., the carbon dioxide capture and separation system 100 shown in FIG. 1). In some instances, the slurry processing systems 300, 320 can be connected between upstream and downstream gas-liquid contactors of a carbon dioxide capture and separation system (e.g., the first and second gas-liquid contactor 102, 106 in the example carbon dioxide capture and separation system 100 in FIG. 1). In some implementations, the slurry processing systems 300, 320 can increase a concentration of precipitated reaction products in a $CO_2$-rich slurry received from the upstream process and produce a solid-enriched $CO_2$-rich slurry for the downstream process and a clarified $CO_2$-lean solution for the upstream process. In some instances, the slurry processing systems 300, 320 may include other components; devices and components in the slurry processing systems 300, 320 may be connected and operated in another manner. For example, the example slurry processing systems 300, 320 may include one or more additional gravity-driven separation units, one or more centrifugal force-driven separation units, one or more heat exchangers, or other components or devices shown in FIGS. 2A-2C or in another manner.

As shown in FIG. 3A, the slurry processing system 300 includes a gravity-driven separation unit 302, a heat exchanger 304, and a pump 318. Mixed stream 312S as an output from the gravity-driven separation unit 302 in response to a first input mixed stream 312 received, may contain a high concentration of solid precipitates which may become difficult to handle, pump, or transfer. To improve processability, an appropriate amount of heated liquid in solution stream 314 after going through the heat exchanger 304 can be added to mixed stream 312S to form mixed stream 312M. The added liquid increases the overall solvent content, allowing some solid precipitates to dissolve or reduce the effective solids concentration, while other solid precipitates become better suspended. The resulting diluted and pumpable mixture in mixed stream 312M can then be more easily conveyed, transferred, or processed in downstream operations by operation of the pump 318 while maintaining the high molar conversion of the stream. In some instances, mixed stream 312M may have a temperature in a range of 20-60° C. The solid precipitates in the mixed stream 312M may be in a range of 30-80 wt %. A value of the molar conversion is in a range of 40-95%. In some instances, mixed stream 316 may have the same properties as the streams 312M, 218, 126B.

In some instances, mixed stream 312 may be implemented as mixed stream 212M from the first gravity-driven separation unit 204 in FIGS. 2A-2C, mixed stream 216M from the heat exchanger 210 in FIG. 2B, a combination of mixed streams 212M and 216M, or may be implemented as other mixed streams from other components in the slurry processing system; and solution stream 314 may be implemented as solution stream 216L from the centrifugal force-driven separation unit 208 in FIGS. 2A-2B, solution stream 212L from the first gravity-driven separation unit 204, solution stream 218L from the second gravity-driven separation unit 206, or may be implemented as other solution streams from other components in the slurry processing system. For example, solution stream 314 includes a rinsing solution from the first gas-liquid contactor 102 during a washing cycle of the interfacial surface structure in the first gas-liquid contactor 102. In some instances, the gaseous feed can be paused during the washing cycle. In some instances, solid precipitations on surfaces of the interfacial surface structure can be rinsed by a rinsing media. In some instances, a rinsing media may be a fresh alkaline capture solution at room temperature or a temperature above the room temperature, a clarified $CO_2$-lean solution at room temperature or a temperature above the room temperature, water at room temperature or a temperature aintebove the room temperature, steam generated by a steam generator connected to the first gas-liquid contactor 102, or another rinsing solution. In some instances, solution stream 314 has a temperature in a range of 5-40° C. before the heat exchanger 314. The concentration of solid precipitates in solution stream 314 is in a range of 0-2 wt % depending on the hardware limitations. A value of the molar conversion is in a range of 40-80% when water is used to rinse.

As shown in FIG. 3B, the slurry processing system 320 includes two centrifugal force-driven separation units 322A, 322B. A first centrifugal force-driven separation unit 322A receives mixed stream 324 containing both liquid and solid precipitates and produces two output streams: solution stream 324L and mixed stream 324S. Solution stream 324L is directed through a heat exchanger 328 which reduces the temperature of solution 324L; and thus, the weight percentage of precipitated reaction products in mixed stream 326M on the downstream end of the heat exchanger 328 can be increased. As shown in FIG. 3B, mixed stream 326M is then directed through a second centrifugal force-driven separation unit 322B, which is configured to produce two streams including mixed stream 326S and solution stream 326L. In some instances, solution stream 326L may be passed to the upstream loop of absorption reaction directly or via a solvent tank (e.g., the solvent tank 202 in FIGS. 2A-2C). In some instances, the slurry processing system 320 may include more than two centrifugal force-driven separation units 322A, 322B. In this case, solution stream 326L may be passed to a third centrifugal force-driven separation unit or another liquid-solid separation unit to further reduce the weight percentage of the precipitated reaction products and further clarification of the solution. In some instances, mixed stream 324 may be implemented as the second input mixed stream 216 from the second gas-liquid contactor via the heat exchanger. In some instances, mixed stream 324 may be obtained through other components or devices in a carbon dioxide capture and separation system. In some instances, mixed streams 324S, 326S output from the two centrifugal force-driven separation units may be passed to a second gas-liquid contactor via a heat exchange for downstream stripping process (as shown in FIG. 2A). In some instances, mixed streams 324S, 326S may be passed to a gravity-driven separation unit (e.g., the second gravity-driven separation unit 206 in FIG. 2B) for further solid enrichment. In some instances, mixed stream 324S may be passed to a second gas-liquid contactor via a heat exchange for downstream stripping process; and mixed stream 326S may be passed to a gravity-driven separation unit for further solid enrichment. In some instances, mixed streams 324S, 326S may be processed by other components or devices in another manner.

FIG. 4 is a flow chart showing aspects of an example process 400 for removing $CO_2$ gas from a gaseous feed. The example process 400 can be used, for example, to operate a carbon dioxide capture and separation system, e.g., the example carbon dioxide capture and separation system 100 in FIG. 1. For instance, the example process 400 can be used to perform carbon dioxide separation directly from ambient air, in which case the carbon dioxide capture and separation system may be implemented as a direct air capture (DAC) system. For instance, the example process 400 can be used to perform carbon dioxide separation from flue gas generated from industrial point sources. In some instances, the example process 400 can be used to perform carbon dioxide separation directly from a mixture of ambient air and flue gas. In some instances, the example process 400 can be used to perform carbon dioxide separation directly from ambient air and flue gas in sequence during different time periods. The example process 400 may include additional or different operations, including operations performed by additional or different components, and the operations may be performed in the order shown or in another order. In some implementations, one or more operations in the example process 400 can be performed by a computer system, for instance, by a digital computer system having one or more digital processors (e.g., data processing apparatus of the control system 156 in FIG. 1) that execute instructions (e.g., instructions stored in the memory unit of the control system 156 in FIG. 1).

At 402, a gaseous feed is directed to interact with an alkaline capture solution in a first gas-liquid contactor of a carbon dioxide capture and separation system. The gaseous feed includes $CO_2$ gas. In some examples, the gaseous feed may be drawn from ambient air by a fan or another type of air mover; and the concentration of the $CO_2$ gas in the first gaseous feed is equal to or less than 1500 parts per million (ppm). In some instances, the gaseous feed may include a flue gas and the concentration of the $CO_2$ gas in the gaseous feed is equal to or less than 50 wt %. In some examples, the first gas-liquid contactor includes an interfacial surface structure; and the gaseous feed is directed across the surfaces of the interfacial surface structure in the first gas-liquid contactor. Before and during the gaseous feed is directed into the first gas-liquid contactor, the first gas-liquid contactor may be wetted using the alkaline capture solution. In some instances, the alkaline capture solution descends along surfaces of the interfacial surface structure forming wet surfaces, e.g., driven by gravity. The gaseous feed flows across the surfaces of the interfacial surface structure in a crossflow fashion, in a counter flow fashion, or a hybrid flow fashion (e.g., crossflow and counter flow) during which the $CO_2$ gas in the gaseous feed can be react with and dissolved in the alkaline capture solution at the surfaces of the interfacial surface structure in the first gas-liquid contactor and a $CO_2$-rich slurry can be formed. In some instances, the first gas-liquid contactor can be, for example, the first gas-liquid contactors 102 in FIG. 1 or another type of gas-liquid contactor. The alkaline capture solution can be pumped by a pump and distributed by one or more liquid distributor residing at the top of the first gas-liquid contactor. In some implementations, the alkaline capture solution includes an aqueous ionic base, a phase transfer catalyst, an amine or a mixture of amines, one or more carboxylic acid salts of amino acids, and spectator ions.

In some implementations, the $CO_2$-rich slurry has a concentration of captured reaction product (e.g., dissolved and precipitated reaction product) greater than that of the fresh alkaline capture solution that is used before the initiation of the absorption reaction or the clarified $CO_2$-lean solution formed in the slurry processing system which can be cycled back to the first gas-liquid contactor for further absorption reaction. The concentration of the captured reaction products, either in the form of dissolved reaction products and precipitated reaction products, in the $CO_2$-rich slurry can be monitored. When the first gas-liquid contactor is implemented as the first gas-liquid contactor 102 in FIG. 1, in response to the concentration of the captured reaction products in the $CO_2$-rich slurry being less than a $CO_2$ concentration threshold value, the $CO_2$-rich slurry can be circulated internally in the first gas-liquid contactor and continuously used for absorbing $CO_2$ gas in the gaseous feed. In response to the concentration of the captured reaction products in the $CO_2$-rich slurry being equal to or greater than the concentration threshold value of precipitated reaction products, the $CO_2$-rich slurry can be transferred out of the first gas-liquid contactor into the slurry processing system.

In some instances, when the concentration of the captured reaction products in the alkaline capture solution is equal to or greater than a threshold value, solid precipitates of the $CO_2$-rich complex can be formed; and the $CO_2$-rich slurry can be produced. In this case, the $CO_2$-rich slurry from the first gas-liquid contactor may include solid precipitates (e.g., particles containing $CO_2$-rich complex). In some instances, solid precipitates occur after performing the absorption reaction for a certain amount of time. The time needed to form the solid precipitates may be determined by the conditions of the gaseous feed and other environmental factors, for example, humidity, temperature, contaminants, etc. For example, during periods where the humidity is >80% RH, it may be necessary to include dehumidification, heating, cooling, or gas feed modification to induce precipitation. In other cases, solvent will continue to capture $CO_2$ during the higher RH hours and will precipitate when the RH decreases in subsequent hours. For another example, when the absorption reaction occurs in a relative humidity of above 80% throughout the day, or in lower humidity down to average 70% RH where the range in daily humidity swings is limited, forced evaporation, thermal swing (cooling), or other processes can be applied to the first input mixed stream 212 before 204 or integrate dehumidification or feed modification in the gaseous feed 112 to first gas-liquid contactor 102.

At 404, the $CO_2$-rich slurry is directed from the first gas-liquid contactor to a slurry processing system. At 406A, a solid-enriched $CO_2$-rich slurry is obtained. The concentration of the solid precipitates can be increased prior to passing the $CO_2$-rich slurry to the second gas-liquid contactor for the desorption reaction. For example, a slurry processing system (e.g., the slurry processing system 110, 200, 220, 230, 300, 320 as shown in FIGS. 1, 2A-2C, 3A-3B) can be used to increase the content of the solid precipitates in the $CO_2$-rich slurry and produce a solid-enriched $CO_2$-rich slurry as an output. At 406B, a clarified $CO_2$-lean solution is also obtained from the slurry processing system. At 408A, the solid-enriched $CO_2$-rich slurry is directed to a second gas-liquid contactor via a heat exchanger; and at 408B, the clarified $CO_2$-lean solution is directed back to the first gas-liquid contactor for the absorption reaction to continue absorbing the $CO_2$ gas in the gaseous feed to form solid precipitates.

In some instances, the slurry processing system may include multiple liquid-solid separation units for performing multistage separation, solid enrichment and solution clarification. In some instances, the slurry processing system may include one or more gravity-driven separation units. In some instances, the slurry processing system includes one or more centrifugal force-driven separation units. In some instances, a first input mixed stream from the first gas-liquid contactor including the $CO_2$-rich slurry is directed to a first gravity-driven separation unit, wherein the solids are partially retained to produce a solid-enriched $CO_2$-rich slurry with a higher concentration of solid precipitates and a first clarified $CO_2$-lean solution with a lower concentration of solid precipitates relative to the $CO_2$-rich slurry received in the first input mixed stream. The first clarified $CO_2$-lean solution is returned to the first gas-liquid contactor, thereby maintaining liquid flow for further $CO_2$ absorption, while the first solid-enriched $CO_2$-rich slurry is conveyed to a second gravity-driven separation unit for further solid enrichment.

In some implementations, by operation of the second gravity-driven separation unit, the first solid-enriched $CO_2$-rich slurry is separated into a second solid-enriched $CO_2$-rich slurry and a second clarified $CO_2$-lean solution. The second solid-enriched $CO_2$-rich slurry includes a higher concentration of solid precipitates relative to the first solid-enriched $CO_2$-rich slurry, and is passed to the second gas-liquid contactor for $CO_2$ stripping via a heat exchanger. The second clarified $CO_2$-lean solution, having a lower concentration of solid precipitates, can be merged with the first clarified $CO_2$-lean solution from the first gravity-driven separation unit and returned to the upstream process (e.g., the first gas-liquid contactor) to maintain circulation of the clarified $CO_2$-lean solution. In some implementations, each of the first and second gravity-driven separation units can include, without limitation, a spiral classifier, a rake classifier, a gravity belt thickener, a settling tank, a drum filter, or another gravity-based separation apparatus.

In some implementations, a second input mixed stream containing a solid enriched $CO_2$-rich slurry is received from the second gas-liquid contactor and passed through a heat exchanger. The heat exchanger induces a temperature change that reduces the solubility of the dissolved reaction products, thereby forming additional solid precipitates in the solution producing a slurry in an output mixed stream. The second input mixed stream to the slurry processing system, containing both liquid and newly formed solid precipitates, can be then directed to a centrifugal force-driven separation unit. In the centrifugal unit, the second input mixed stream can be separated into a solution stream and a mixed stream. The mixed stream containing a third solid-enriched $CO_2$-rich slurry which includes a majority of solid precipitates, may be merged with the second solid-enriched $CO_2$-rich slurry from the gravity-driven separation unit and conveyed to the downstream gas-liquid contactor, while the solution stream containing a third clarified $CO_2$-lean solution, having a lower solid content, is returned to the upstream loop for continued absorption of $CO_2$.

In some implementations, one or more additional centrifugal force-driven separation units or heat exchangers may be incorporated to increase the concentration of precipitated reaction products and improve processability of solid-rich streams. For example, a third clarified $CO_2$-lean solution from a first centrifugal force-driven separation unit may be cooled via a heat exchanger to induce additional precipitation of solids, forming a fourth solid-enriched $CO_2$-rich slurry. The fourth solid-enriched $CO_2$-rich slurry may be then conveyed to the gravity-driven separation unit for further separation, and the resulting solution and mixed streams can be merged and directed as described above in FIGS. 2A-2C and 3A-3B. In some implementations, liquid such as a rinsing solution may be added to highly concentrated solid streams to form a pumpable slurry, improving transfer and handling in downstream operations.

The method may further include merging streams from multiple separation units, and controlling the flow of the solution through pumps, valves, and piping to maintain efficient $CO_2$ capture, solid precipitation, solid enrichment, liquid-solid separation, and solution clarification. In some instances, the operations of the one or more gravity-driven separation units, the one or more centrifugal force-driven separation units, and the one or more heat exchangers in the slurry processing system are coordinated to maximize solid-liquid separation efficiency, enhance $CO_2$ recovery, and improve overall process operability and energy efficiency.

At 408A, the clarified $CO_2$-lean solution is directed back to the upstream gas-liquid contactor. At 408B, the solid-enriched $CO_2$-rich slurry is directed from the slurry processing system to a second gas-liquid contactor for further absorption reaction. The solid-enriched $CO_2$-rich slurry is passed from the slurry processing system to the second gas-liquid contactor for the desorption reaction. At 410, $CO_2$ gas is extracted from the solid-enriched $CO_2$-rich slurry by operation of the second gas-liquid contactor. In some instances, the solid-enriched $CO_2$-rich slurry in the second gas-liquid contactor can be heated using a heater attached to the second gas-liquid contactor, or steam directed into the second gas-liquid contactor. In some instances, the solid-enriched $CO_2$-rich slurry in the second gas-liquid contactor can be heated in another manner. The $CO_2$-rich slurry can be heated to a temperature sufficient to desorb at least a portion of the capture reaction products and the liquid condensates. At least a portion of the captured reaction products in the $CO_2$-rich slurry can be converted to $CO_2$ gas and extracted. A $CO_2$-lean solution at a high temperature can be regenerated in parallel. In some instances, the second gas-liquid contactor may include multiple trays or may operate as a packed bed to provide an easy vapor-liquid equilibrium and hence separation of the dissolved $CO_2$ gas from vapor/liquid condensate. After passing through the second gas-liquid contactor and a condenser for removing moisture, a $CO_2$ gas with a purity of 91-100% is collected. In some implementations, the purity of the $CO_2$ gas collected is greater than 99.5%. This $CO_2$ gas can then be compressed for geological sequestration or utilization in other applications. In some implementations, the 99.5% pure $CO_2$ after desorption liquified by compression to supercritical $CO_2$ and used in Urea production and to produce dry ice. The 99.5% $CO_2$ that is coming out of desorption is further purified to 99.9% by passing it through solid adsorbents such as zeolites and monolith and then liquefied to use in carbonated water and in beer production. Further purified $CO_2$ to 99.99% then liquefied to use as a low global warming refrigerant in car or industrial refrigeration applications including warehouses. Also used as a heat pump fluid.

In some implementations, when the solid-enriched $CO_2$-rich slurry is passed from the slurry processing system to the second gas-liquid contactor for extracting the captured reaction products, the solid-enriched $CO_2$-rich slurry can be warmed up. For example, the energy needed to warm up the solid-enriched $CO_2$-rich slurry can be obtained by recycling at least a portion of the thermal energy from a solution stream of the regenerated $CO_2$-lean solution using a heat exchanger (e.g., the heat exchanger 114 in FIG. 1), wherein the heat exchanger is configured to transfer heat from the solution stream of the regenerated $CO_2$-lean solution to the solid-enriched $CO_2$-rich slurry. In some instances, the energy needed to warm up the solid-enriched $CO_2$-rich slurry may be obtained in another manner.

In some instances, the gaseous feed can be terminated to allow cleaning of the first gas-liquid contactor. The first gas-liquid contactor can be rinsed to remove solid precipitates on the surfaces of the interfacial surface structures or other components (e.g., a filter unit). Water or fresh alkaline capture solution can be recycled in the first gas-liquid contactor until a termination criterion is reached, e.g., a concentration of dissolved reaction products in the resulting rinsing solution reaches a threshold value. The resulting rinsing solution from the first gas-liquid contactor can be directed towards the downstream process, for example, to improve the processibility of a solid-enriched $CO_2$-rich slurry (FIG. 3B).

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media.

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

In a general aspect, a carbon dioxide capture and separation system with a slurry processing system is presented.

In a first example, a carbon dioxide capture and separation system includes a slurry processing system, a first gas-liquid contactor fluidically connected to the slurry processing system, and a second gas-liquid contactor fluidically connected to the slurry processing system. The slurry processing system is configured to receive a $CO_2$-rich slurry including precipitated reaction products from the first gas-liquid contactor in a first mixed stream. The slurry processing system includes a gravity-driven separation unit, which is fluidically connected to the first gas-liquid contactor. The slurry processing system is configured to form a solid-enriched $CO_2$-rich slurry in a second mixed stream based on the $CO_2$-rich slurry and form a clarified $CO_2$-lean solution in a first solution stream based on the $CO_2$-rich slurry. The solid-enriched $CO_2$-rich slurry has a higher concentration of precipitated reaction products than that of the $CO_2$-rich slurry received in the first mixed stream, and the clarified $CO_2$-lean solution having a lower concentration of precipitated reaction products than that of the $CO_2$-rich slurry received in the first mixed stream. The first gas-liquid contactor is configured to receive a gaseous feed, and receive the clarified $CO_2$-lean solution in the first solution stream from the slurry processing system. The clarified $CO_2$-lean solution captures $CO_2$ from the gaseous feed to form the $CO_2$-rich slurry. The second gas-liquid contactor is configured to receive the solid-enriched $CO_2$-rich slurry in the second mixed stream; and extract $CO_2$ from the solid-enriched $CO_2$-rich slurry.

Implementations of the first example may include one or more of the following features. The gravity-driven separation unit includes a spiral classifier, a lamella clarifier, or a drum filter. The first gas-liquid contactor includes an interfacial surface structure, and the precipitated reaction products in the $CO_2$-rich slurry are formed on surfaces of the interfacial surface structure. The gravity-driven separation unit is a first gravity-driven separation unit, the solid-enriched $CO_2$-rich slurry is a first solid-enriched $CO_2$-rich slurry, the clarified $CO_2$-lean solution is a first clarified $CO_2$-lean solution. The slurry processing system includes a second gravity-driven separation unit positioned upstream of the first gravity-driven separation unit. The second gravity-driven separation unit is configured to receive the $CO_2$-rich slurry in the first mixed stream from the first gas-liquid contactor, and partially separate the precipitated reaction products from the $CO_2$-rich slurry before the first gravity-driven separation unit to form a second solid-enriched $CO_2$-rich slurry in a third mixed stream having a higher concentration of precipitated reaction products than that of the $CO_2$-rich slurry in the first mixed stream and a second clarified $CO_2$-lean solution in a second solution stream having a lower concentration of precipitated reaction products than that of the $CO_2$-rich slurry in the first mixed stream. The first gravity-driven separation unit is configured to receive the second solid-enriched $CO_2$-rich slurry in the third mixed stream from the second gravity-driven separation unit.

Implementations of the first example may include one or more of the following features. The first gas-liquid contactor is configured to receive the second clarified $CO_2$-lean solution in the second solution stream from the second gravity-driven separation unit. The slurry processing system includes a solvent tank configured to collect and merge the first and second clarified $CO_2$-lean solution from the first and second solution streams before directing them to the first gas-liquid contactor. Extracting the $CO_2$ from the first solid-enriched $CO_2$-rich slurry produces a regenerated $CO_2$-lean solution. The system further comprises a heat exchanger positioned between the slurry processing system and the second gas-liquid contactor. The heat exchanger is configured to receive the regenerated $CO_2$-lean solution in the second solution stream and the first solid-enriched $CO_2$-rich slurry in the second mixed stream as input; transfer heat from the regenerated $CO_2$-lean solution in the second solution stream to the first solid-enriched $CO_2$-rich slurry in the second mixed stream; and produce a third solid-enriched $CO_2$-rich slurry in a fourth mixed stream and a fourth solid-enriched $CO_2$-rich slurry in a fifth mixed stream as output.

Implementations of the first example may include one or more of the following features. The slurry processing system is configured to receive the third solid-enriched $CO_2$-rich slurry in the fourth mixed stream from the heat exchanger, and form the first solid-enriched $CO_2$-rich slurry based on the second solid-enriched $CO_2$-rich slurry and the third solid-enriched $CO_2$-rich slurry. The slurry processing system further includes a centrifugal force-driven separation unit configured to receive the third solid-enriched $CO_2$-rich slurry in the fourth mixed stream from the heat exchanger, and form a fourth solid-enriched $CO_2$-rich slurry in a fifth mixed stream having a higher concentration of precipitated reaction products than that of the third solid-enriched $CO_2$-rich slurry in the fourth mixed stream, and form a third clarified $CO_2$-lean solution in a third solution stream having a lower concentration of precipitated reaction products than that of the third solid-enriched $CO_2$-rich slurry in the fourth mixed stream. The centrifugal force-driven separation unit is a hydrocyclone.

Implementations of the first example may include one or more of the following features. The slurry processing system includes multiple centrifugal-force driven separation units connected in series to perform multistage enrichment of precipitated reaction products in the third solid-enriched $CO_2$-rich slurry from the heat exchanger. The second gas-liquid contactor is configured to receive the fourth solid-enriched $CO_2$-rich slurry in the fifth mixed stream; and the $CO_2$ extracted in the second gas-liquid contactor comprises $CO_2$ from the fourth solid-enriched $CO_2$-rich slurry. The first gas-liquid contactor is configured to receive the third clarified $CO_2$-lean solution in the third solution stream from the centrifugal force-driven separation unit. The heat exchanger is a first heat exchanger, and the slurry processing system includes a second heat exchanger configured to receive the third clarified $CO_2$-lean solution in the third solution stream from the centrifugal force-driven separation unit, and form a fifth solid-enriched $CO_2$-rich slurry in a sixth mixed stream.

Implementations of the first example may include one or more of the following features. The first gravity-driven separation unit is configured to receive the fifth solid-enriched $CO_2$-rich slurry in the sixth mixed stream from the second heat exchanger; and form the first solid-enriched $CO_2$-rich slurry in the second mixed stream based on the second solid-enriched $CO_2$-rich slurry and the fifth solid-enriched $CO_2$-rich slurry. Extracting the $CO_2$ from the solid-enriched $CO_2$-rich slurry produces a regenerated $CO_2$-lean solution, and the regenerated $CO_2$-lean solution includes potassium carbonate as an aqueous ionic base, trimethyl butyl ammonium hydroxide as a phase transfer catalyst, one or more of the following: N-methylglycine (Sarcosine), N,N-dimethylglycine (DMG), or Glycine as a free amino acid or their mixture, a carboxylic acid salt of any amino acid, a potassium, sodium or quaternary ammonium carboxylic acid salts of N-methylglycine (Sarcosine), N,N-dimethylglycine or Glycine or their mixture, any deprotonated amino acids and their mixture, as a promoter, and spectator ions. The regenerated $CO_2$-lean solution includes an aqueous ionic base having a pH in a range of 8 to 14. The gaseous feed has a $CO_2$ concentration below 1500 parts per million (ppm). The gaseous feed has a $CO_2$ concentration below 50 wt %. The slurry processing system is configured to receive a second solution stream comprising a rinsing solution from the first gas-liquid contactor; and to produce a third mixed stream by merging the second mixed stream with the second solution stream.

In a second example, a carbon dioxide capture and separation method includes directing a $CO_2$-rich slurry from a first gas-liquid contactor to a slurry processing system in a first mixed stream, the $CO_2$-rich slurry comprising precipitated reaction products, the slurry processing system comprising a gravity-driven separation unit; by operation of the gravity-driven separation unit of the slurry processing system, forming a solid-enriched $CO_2$-rich slurry in a second mixed stream based on the $CO_2$-rich slurry, and forming a clarified $CO_2$-lean solution in a first solution stream based on the $CO_2$-rich slurry. The solid-enriched $CO_2$-rich slurry has a higher concentration of precipitated reaction products than that of the $CO_2$-rich slurry in the first mixed stream; and the clarified $CO_2$-lean solution has a lower concentration of precipitated reaction products than that of the $CO_2$-rich slurry in the first mixed stream. The method further includes directing the clarified $CO_2$-lean solution to the first gas-liquid contactor fluidically connected to the slurry processing system; forming, by operation of the first gas-liquid contactor, the solid-enriched $CO_2$-rich slurry by interacting a gaseous feed with the clarified $CO_2$-lean solution such that the clarified $CO_2$-lean solution captures $CO_2$ from the gaseous feed; directing the solid-enriched $CO_2$-rich slurry to a second gas-liquid contactor fluidically connected to the slurry processing system; and extracting, by operation of the second gas-liquid contactor, $CO_2$ from the solid-enriched $CO_2$-rich slurry.

Implementations of the second example may include one or more of the following features. The gravity-driven separation unit is a first gravity-driven separation unit. The solid-enriched $CO_2$-rich slurry is a first solid-enriched $CO_2$-rich slurry. The clarified $CO_2$-lean solution is a first clarified $CO_2$-lean solution. The method further includes receiving, by operation of a second gravity-driven separation unit positioned upstream of the first gravity-driven separation unit, the $CO_2$-rich slurry from the first gas-liquid contactor in the first mixed stream; partially separating the precipitated reaction products from the $CO_2$-rich slurry before the first gravity-driven separation unit to form a second solid-enriched $CO_2$-rich slurry in a third mixed stream having a higher concentration of precipitated reaction products than that of the $CO_2$-rich slurry in the first mixed stream and to form a second clarified $CO_2$-lean solution in a second solution stream having a lower concentration of precipitated reaction products than that of the $CO_2$-rich slurry in the first mixed stream; and directing the second solid-enriched $CO_2$-rich slurry in the third mixed stream from the second gravity-driven separation unit to the first gravity-driven separation unit.

Implementations of the second example may include one or more of the following features. The method includes directing the second clarified $CO_2$-lean solution in the second solution stream from the second gravity-driven separation unit to the first gas-liquid contactor. Extracting the $CO_2$ from the solid-enriched $CO_2$-rich slurry produces a regenerated $CO_2$-lean solution, and the method further includes receiving, at input ports of a heat exchanger positioned between the slurry processing system and the second gas-liquid contactor, the regenerated $CO_2$-lean solution in the second solution stream and the first solid-enriched $CO_2$-rich slurry in the second mixed stream; transferring, by operation the heat exchanger, heat from the regenerated $CO_2$-lean solution in the second solution stream to the solid-enriched $CO_2$-rich slurry; and producing, at output ports of the heat exchanger, a third solid-enriched $CO_2$-rich slurry in a fourth mixed stream and a fourth solid-enriched $CO_2$-rich slurry in a fifth mixed stream.

Implementations of the second example may include one or more of the following features. The method includes directing the third solid-enriched $CO_2$-rich slurry in the fourth mixed stream from the heat exchanger to the slurry processing system, and forming, by operation of the first gravity-driven separation unit, the first solid-enriched $CO_2$-rich slurry based on the second solid-enriched $CO_2$-rich slurry and the third solid-enriched $CO_2$-rich slurry. The slurry processing system further includes a centrifugal force-driven separation unit, and the method further includes directing the third solid-enriched $CO_2$-rich slurry in the fourth mixed stream from the heat exchanger to the centrifugal force-driven separation unit of the slurry processing system, and forming, by operation of the centrifugal force-driven separation unit, a fourth solid-enriched $CO_2$-rich slurry in a fifth mixed stream having a higher concentration of precipitated reaction products than that of the third solid-enriched $CO_2$-rich slurry in the fourth mixed stream, and forming a third clarified $CO_2$-lean solution in a third solution stream having a lower concentration of precipitated reaction products than that of the third solid-enriched $CO_2$-rich slurry in the fourth mixed stream.

Implementations of the second example may include one or more of the following features. The method further includes pausing the gaseous feed to the first gas-liquid contactor; forming a rinsing solution by rinsing the first gas-liquid contactor with a rinsing media; directing the rinsing solution to the slurry processing system from the first gas-liquid contactor; and prior to directing the solid-enriched $CO_2$-rich slurry to the second gas-liquid contactor, merging the rinsing solution with the solid-enriched $CO_2$-rich slurry. The gravity-driven separation unit includes one of a spiral classifier, a lamella clarifier, a gravity belt thickener, or a drum filter.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple implementations separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A carbon dioxide capture and separation system comprising:

a slurry processing system configured to receive a $CO_2$-rich slurry comprising precipitated reaction products from a first gas-liquid contactor in a first mixed stream, the slurry processing system comprising a gravity-driven separation unit, the gravity-driven separation unit fluidically connected to the first gas-liquid contactor and configured to:

form a solid-enriched $CO_2$-rich slurry in a second mixed stream based on the $CO_2$-rich slurry, the solid-enriched $CO_2$-rich slurry having a higher concentration of precipitated reaction products than that of the $CO_2$-rich slurry received in the first mixed stream, and form a clarified $CO_2$-lean solution in a first solution stream based on the $CO_2$-rich slurry, the clarified $CO_2$-lean solution having a lower concentration of precipitated reaction products than that of the $CO_2$-rich slurry received in the first mixed stream;

the first gas-liquid contactor fluidically connected to the slurry processing system and configured to:

receive a gaseous feed, and receive the clarified $CO_2$-lean solution in the first solution stream from the slurry processing system, wherein the clarified $CO_2$-lean solution captures $CO_2$ from the gaseous feed to form the $CO_2$-rich slurry; and a second gas-liquid contactor fluidically connected to the slurry processing system and configured to:

receive the solid-enriched $CO_2$-rich slurry in the second mixed stream; and extract $CO_2$ from the solid-enriched $CO_2$-rich slurry.

2. The system of claim 1, wherein the gravity-driven separation unit comprises a spiral classifier.

3. The system of claim 1, wherein the gravity-driven separation unit comprises a lamella clarifier.

4. The system of claim 1, wherein the gravity-driven separation unit comprises a drum filter.

5. The system of claim 1, wherein the first gas-liquid contactor comprises an interfacial surface structure, and the precipitated reaction products in the $CO_2$-rich slurry are formed on surfaces of the interfacial surface structure.

6. The system of claim 1, wherein the gravity-driven separation unit is a first gravity-driven separation unit, the solid-enriched $CO_2$-rich slurry is a first solid-enriched $CO_2$-rich slurry, the clarified $CO_2$-lean solution is a first clarified $CO_2$-lean solution, the slurry processing system comprises a second gravity-driven separation unit positioned upstream of the first gravity-driven separation unit and configured to:

receive the $CO_2$-rich slurry in the first mixed stream from the first gas-liquid contactor, and partially separate the precipitated reaction products from the $CO_2$-rich slurry before the first gravity-driven separation unit to form a second solid-enriched $CO_2$-rich slurry in a third mixed stream having a higher concentration of precipitated reaction products than that of the $CO_2$-rich slurry in the first mixed stream and a second clarified $CO_2$-lean solution in a second solution stream having a lower concentration of precipitated reaction products than that of the $CO_2$-rich slurry in the first mixed stream, and the first gravity-driven separation unit is configured to receive the second solid-enriched $CO_2$-rich slurry in the third mixed stream from the second gravity-driven separation unit.

7. The system of claim 6, wherein the first gas-liquid contactor is configured to receive the second clarified $CO_2$-lean solution in the second solution stream from the second gravity-driven separation unit.

8. The system of claim 7, wherein the slurry processing system comprises a solvent tank configured to collect and merge the first and second clarified $CO_2$-lean solution from the first and second solution streams before directing them to the first gas-liquid contactor.

9. The system of claim 6, wherein extracting the $CO_2$ from the first solid-enriched $CO_2$-rich slurry produces a regenerated $CO_2$-lean solution, the system further comprises a heat exchanger positioned between the slurry processing system and the second gas-liquid contactor, the heat exchanger configured to receive the regenerated $CO_2$-lean solution in the second solution stream and the first solid-enriched $CO_2$-rich slurry in the second mixed stream as input;

transfer heat from the regenerated $CO_2$-lean solution in the second solution stream to the first solid-enriched $CO_2$-rich slurry in the second mixed stream; and produce a third solid-enriched $CO_2$-rich slurry in a fourth mixed stream as output.

10. The system of claim 9, wherein the slurry processing system is configured to:

receive the third solid-enriched $CO_2$-rich slurry in the fourth mixed stream from the heat exchanger, and form the first solid-enriched $CO_2$-rich slurry based on the second solid-enriched $CO_2$-rich slurry and the third solid-enriched $CO_2$-rich slurry.

11. The system of claim 9, wherein the slurry processing system further comprises a centrifugal force-driven separation unit configured to:

receive the third solid-enriched $CO_2$-rich slurry in the fourth mixed stream from the heat exchanger, form a fourth solid-enriched $CO_2$-rich slurry in a fifth mixed stream having a higher concentration of precipitated reaction products than that of the third solid-enriched $CO_2$-rich slurry in the fourth mixed stream, and form a third clarified $CO_2$-lean solution in a third solution stream having a lower concentration of precipitated reaction products than that of the third solid-enriched $CO_2$-rich slurry in the fourth mixed stream.

12. The system of claim 11, wherein the centrifugal force-driven separation unit is a hydrocyclone.

13. The system of claim 11, wherein the slurry processing system comprises multiple centrifugal-force driven separation units connected in series to perform multistage enrichment of precipitated reaction products in the third solid-enriched $CO_2$-rich slurry from the heat exchanger.

14. The system of claim 11, wherein:

the second gas-liquid contactor is configured to receive the fourth solid-enriched $CO_2$-rich slurry in the fifth mixed stream; and the $CO_2$ extracted in the second gas-liquid contactor comprises $CO_2$ from the fourth solid-enriched $CO_2$-rich slurry.

15. The system of claim 14, wherein the first gas-liquid contactor is configured to receive the third clarified $CO_2$-lean solution in the third solution stream from the centrifugal force-driven separation unit.

16. The system of claim 14, wherein the heat exchanger is a first heat exchanger, and the slurry processing system comprises a second heat exchanger configured to:

receive the third clarified $CO_2$-lean solution in the third solution stream from the centrifugal force-driven separation unit, and form a fifth solid-enriched $CO_2$-rich slurry in a sixth mixed stream.

17. The system of claim 16, wherein the first gravity-driven separation unit is configured to:

receive the fifth solid-enriched $CO_2$-rich slurry in the sixth mixed stream from the second heat exchanger; and form the first solid-enriched $CO_2$-rich slurry in the second mixed stream based on the second solid-enriched $CO_2$-rich slurry and the fifth solid-enriched $CO_2$-rich slurry.

18. The system of claim 1, wherein extracting the $CO_2$ from the solid-enriched $CO_2$-rich slurry produces a regenerated $CO_2$-lean solution, and the regenerated $CO_2$-lean solution comprises:

potassium carbonate, sodium carbonate, ammonium or quaternary ammonium carbonate or their mixtures as an aqueous ionic base;

tetrabutylammonium hydroxide or trimethyl ethyl ammonium hydroxide as a phase transfer catalyst;

an amine or a mixture of amines;

one or more of the following: N-methylglycine (Sarcosine), N,N-dimethylglycine (DMG), or Glycine as a free amino acid or their mixture, a carboxylic acid salt of any amino acid, a potassium, sodium or quaternary ammonium carboxylic acid salts of N-methylglycine, N,N-dimethylglycine or Glycine or their mixture, any deprotonated amino acids and their mixture, as a promoter; and spectator ions.

19. The system of claim 18, wherein the regenerated $CO_2$-lean solution comprises an aqueous ionic base having a pH in a range of 8 to 14.

20. The system of claim 1, wherein the gaseous feed has a $CO_2$ concentration below 1500 parts per million (ppm).

21. The system of claim 1, wherein the gaseous feed has a $CO_2$ concentration below 50 wt %.

22. The system of claim 1, wherein the slurry processing system is configured to:

receive a second solution stream comprising a rinsing solution from the first gas-liquid contactor; and produce a third mixed stream by merging the second mixed stream with the second solution stream.

23. A carbon dioxide capture and separation method, comprising:

directing a $CO_2$-rich slurry from a first gas-liquid contactor to a slurry processing system in a first mixed stream, the $CO_2$-rich slurry comprising precipitated reaction products, the slurry processing system comprising a gravity-driven separation unit;

by operation of the gravity-driven separation unit of the slurry processing system, forming a solid-enriched $CO_2$-rich slurry in a second mixed stream based on the $CO_2$-rich slurry, the solid-enriched $CO_2$-rich slurry having a higher concentration of precipitated reaction products than that of the $CO_2$-rich slurry in the first mixed stream; and forming a clarified $CO_2$-lean solution in a first solution stream based on the $CO_2$-rich slurry, the clarified $CO_2$-lean solution having a lower concentration of precipitated reaction products than that of the $CO_2$-rich slurry in the first mixed stream;

directing the clarified $CO_2$-lean solution to the first gas-liquid contactor fluidically connected to the slurry processing system;

forming, by operation of the first gas-liquid contactor, the solid-enriched $CO_2$-rich slurry by interacting a gaseous feed with the clarified $CO_2$-lean solution such that the clarified $CO_2$-lean solution captures $CO_2$ from the gaseous feed;

directing the solid-enriched $CO_2$-rich slurry to a second gas-liquid contactor fluidically connected to the slurry processing system; and extracting, by operation of the second gas-liquid contactor, $CO_2$ from the solid-enriched $CO_2$-rich slurry.

24. The method of claim 23, wherein the gravity-driven separation unit is a first gravity-driven separation unit, the solid-enriched $CO_2$-rich slurry is a first solid-enriched $CO_2$-rich slurry, the clarified $CO_2$-lean solution is a first clarified $CO_2$-lean solution, and the method further comprises:

receiving, by operation of a second gravity-driven separation unit positioned upstream of the first gravity-driven separation unit, the $CO_2$-rich slurry from the first gas-liquid contactor in the first mixed stream;

partially separating the precipitated reaction products from the $CO_2$-rich slurry before the first gravity-driven separation unit to form a second solid-enriched $CO_2$-rich slurry in a third mixed stream having a higher concentration of precipitated reaction products than that of the $CO_2$-rich slurry in the first mixed stream and to form a second clarified $CO_2$-lean solution in a second solution stream having a lower concentration of precipitated reaction products than that of the $CO_2$-rich slurry in the first mixed stream; and directing the second solid-enriched $CO_2$-rich slurry in the third mixed stream from the second gravity-driven separation unit to the first gravity-driven separation unit.

25. The method of claim 24, comprising:

directing the second clarified $CO_2$-lean solution in the second solution stream from the second gravity-driven separation unit to the first gas-liquid contactor.

26. The method of claim 24, wherein extracting the $CO_2$ from the solid-enriched $CO_2$-rich slurry produces a regenerated $CO_2$-lean solution, and the method further comprises:

receiving, at input ports of a heat exchanger positioned between the slurry processing system and the second gas-liquid contactor, the regenerated $CO_2$-lean solution in the second solution stream and the first solid-enriched $CO_2$-rich slurry in the second mixed stream;

transferring, by operation the heat exchanger, heat from the regenerated $CO_2$-lean solution in the second solution stream to the solid-enriched $CO_2$-rich slurry; and producing, at output ports of the heat exchanger, a third solid-enriched $CO_2$-rich slurry in a fourth mixed stream.

27. The method of claim 26, comprising:

directing the third solid-enriched $CO_2$-rich slurry in the fourth mixed stream from the heat exchanger to the slurry processing system, and forming, by operation of the first gravity-driven separation unit, the first solid-enriched $CO_2$-rich slurry based on the second solid-enriched $CO_2$-rich slurry and the third solid-enriched $CO_2$-rich slurry.

28. The method of claim 26, wherein the slurry processing system further comprises a centrifugal force-driven separation unit, and the method further comprises:

directing the third solid-enriched $CO_2$-rich slurry in the fourth mixed stream from the heat exchanger to the centrifugal force-driven separation unit of the slurry processing system, and forming, by operation of the centrifugal force-driven separation unit, a fourth solid-enriched $CO_2$-rich slurry in a fifth mixed stream having a higher concentration of precipitated reaction products than that of the third solid-enriched $CO_2$-rich slurry in the fourth mixed stream, and a third clarified $CO_2$-lean solution in a third solution stream having a lower concentration of precipitated reaction products than that of the third solid-enriched $CO_2$-rich slurry in the fourth mixed stream.

29. The method of claim 23, comprising:

pausing the gaseous feed to the first gas-liquid contactor;

forming a rinsing solution by rinsing the first gas-liquid contactor with a rinsing media;

directing the rinsing solution to the slurry processing system from the first gas-liquid contactor; and prior to directing the solid-enriched $CO_2$-rich slurry to the second gas-liquid contactor, merging the rinsing solution with the solid-enriched $CO_2$-rich slurry.

30. The method of claim 23, wherein the gravity-driven separation unit comprises one of a spiral classifier, a lamella clarifier, a gravity belt thickener, or a drum filter.

* * * * *